(12) United States Patent
Kashima et al.

(10) Patent No.: US 7,881,542 B2
(45) Date of Patent: Feb. 1, 2011

(54) CODING APPARATUS, DECODING APPARATUS, CODING METHOD AND DECODING METHOD

(75) Inventors: Hideharu Kashima, Kanagawa (JP); Daisuke Hiranaka, Kanagawa (JP); Yukio Yanagita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1497 days.

(21) Appl. No.: 11/260,847

(22) Filed: Oct. 27, 2005

(65) Prior Publication Data

US 2006/0093043 A1    May 4, 2006

(30) Foreign Application Priority Data

Oct. 29, 2004    (JP) ............................. 2004-317003

(51) Int. Cl.
*G06K 9/36* (2006.01)
(52) U.S. Cl. ........................ 382/232; 375/240; 382/250
(58) Field of Classification Search ............ 370/395.64; 375/E7.028, E7.143, E7.148, E7.169, E7.17, 375/E7.171, E7.176, E7.211, E7.224, E7.226, 375/E7.23, 240.2; 380/217; 382/232, 250; 704/E19.014; 708/402
See application file for complete search history.

(56) References Cited

U.S. PATENT DOCUMENTS

| 5,629,736 | A | * | 5/1997 | Haskell et al. | ........... 348/386.1 |
| 5,714,952 | A | * | 2/1998 | Wada | .......................... 341/94 |
| 5,841,793 | A | * | 11/1998 | Fukuda | ....................... 714/752 |
| 5,907,660 | A | * | 5/1999 | Inoue et al. | .................. 386/109 |
| 6,263,019 | B1 | * | 7/2001 | Ryan | ..................... 375/240.02 |
| 6,269,119 | B1 | * | 7/2001 | Ueda | ..................... 375/240.01 |
| 6,339,617 | B1 | * | 1/2002 | Ueda | ..................... 375/240.16 |
| 7,020,823 | B2 | * | 3/2006 | Bushmitch et al. | .......... 714/752 |
| 2005/0232501 | A1 | * | 10/2005 | Mukerjee | .................... 382/239 |

FOREIGN PATENT DOCUMENTS

JP    3-1689    1/1991

* cited by examiner

*Primary Examiner*—Bhavesh M Mehta
*Assistant Examiner*—Gregory F Cunningham
(74) *Attorney, Agent, or Firm*—Frommer Lawrence & Haug LLP; William S. Frommer; Thomas F. Presson

(57) ABSTRACT

A coding apparatus that can have a plurality of macro blocks processed concurrently. The apparatus includes a plurality of macro block processing sections for coding moving picture data concurrently on a macro block by macro block basis, and a state management section for managing the state of processing of each macro block in a single picture. The state management section being adapted to manage each macro block in a single picture in terms of being in a process completed state.

20 Claims, 27 Drawing Sheets

FIG.6

| Codec | Condition for processing MB of (x, y) | Flowchart for checking if (x0, y0) is processable or not |
|---|---|---|
| MPEG4 or AVC | (x+1,y-1) ← → (x,y)<br>(x-1,y) | U331: Start checking (x0, y0) → st0 = 1 if ST [S03] [y0 − 1] > x + 1 and ST [S03] [y0] > x − 1 and ST [S01] [y] > x Otherwise st0 = 0 → Return |
| MPEG2 | (x,y)<br>(x-1,y) | U332: Start checking (x0, y0) → st0 = 1 if ST [S03] [y0] > x − 1 and ST [S01] [y0] > x Otherwise st0 = 0 → Return |

FIG.15

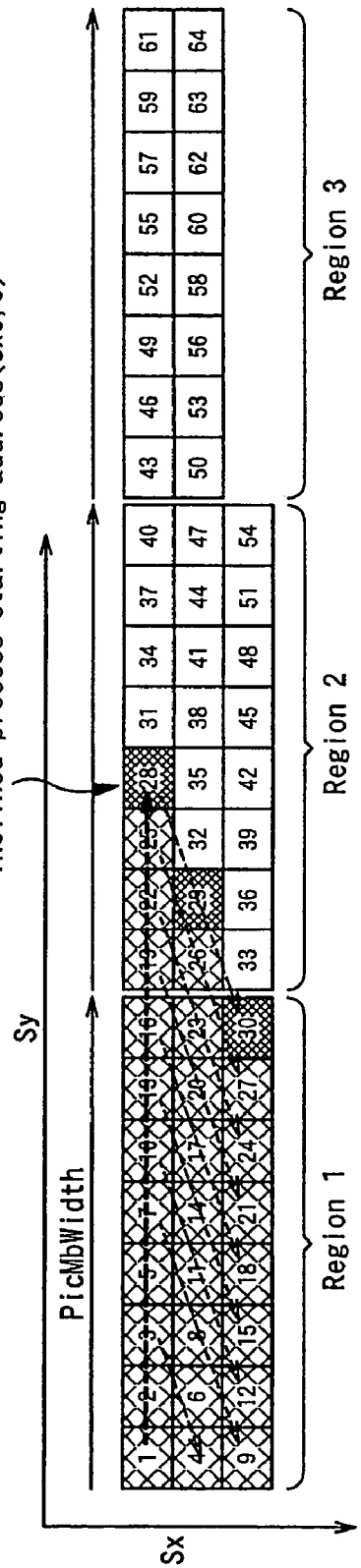
FIG.24A
FIG.24B

Having dependency relationship with left, upper left, upper and upper right macro blocks

CODING APPARATUS, DECODING APPARATUS, CODING METHOD AND DECODING METHOD

CROSS REFERENCES TO RELATED APPLICATIONS

The present invention contains subject matter related to Japanese Patent Application JP 2004-317003 filed in the Japanese Patent Office on Oct. 29, 2004, the entire contents of which being incorporated herein by reference.

BACKGROUND OF THE INVENTION

1. Field of the Invention

This invention relates to a coding apparatus, a decoding apparatus, a coding method and a decoding method for moving picture data.

2. Description of the Related Art

Known coding standards for moving picture data include MPEG-2 (ISO/IEC13818-2 Information Technology—Generic Coding of moving pictures and associated audio information: Video) and MPEG-4 (ISO/IEC 14496 Information Technology—Generic Coding of Audio-Visual Object).

Additionally, new coding standards for moving picture data that have been proposed in recent years include H.264/MPEG-4 AVC (ITU-T Rec. H 264 ISO/IEC 14496-10 AVC) and WMV 9 (Windows Media Video 9 (trademark)).

According to any of these coding standards, a picture (frame) is divided into a predetermined number of blocks (luminance components: 16 pixels×16 pixels) and the coding process and the decoding process is conducted on a block by block basis. Such a pixel block is referred to as macro block.

It may be conceivable to bring in a plurality of macro block processing engines (which may be hardware modules or software modules) and have these macro block processing engines operate concurrently in order to conduct a coding or decoding process at high speed.

According to the MPEG-2, when a macro block is coded or decoded, the outcome of the coding or decoding process, whichever appropriate, carried out on the left side macro block that is located immediately adjacent to the macro block in question is referred to as shown in FIG. 29 of the accompanying drawings. In other words, the coding or decoding process on the immediately adjacently located left side macro block has to be completed when a coding or decoding process, whichever appropriate, is conducted on the macro block in question. The relationship as described above is referred to as "having a dependency relationship with the left side".

Since each macro block has a dependency relationship with the left side according to MPEG-2, when a plurality of macro block processing engines are driven to operate concurrently, it may be so arranged that each macro block processing engine processes a group of transversally arranged macro blocks sequentially from the left end one. A group of macro blocks arranged transversally is referred to as a "slice".

SUMMARY OF THE INVENTION

Meanwhile, when a coding or decoding process is conducted on an arbitrarily selected macro block according to a new coding standard such as the MPEG-4 Standard or the H. 264/MPEG-4 AVC Standard, the outcome of the processes conducted on the left, upper left, upper and upper right macro blocks is referred to. Therefore, the four coding or decoding processes of at least the left, upper left, upper and upper right macro blocks have to be completed when the coding or decoding process, whichever appropriate, is conducted on the macro block in question. In other words, according to a new coding standard such as the MPEG-4 Standard or the H. 264/MPEG-4 AVC Standard, each macro block has a dependency relationship with the left, upper left, upper and upper right macro blocks.

Therefore, when a plurality of macro block processing engines is driven to operate concurrently, they cannot adapt themselves to the new standard if each of them processes a slice.

In view of this problem, it is therefore desirable to provide a coding or decoding apparatus and a coding or decoding method that can have a plurality of macro blocks processed concurrently according to a new standard such as the MPEG-4 Standard or the H. 264/MPEG-4 AVC Standard.

According to the present invention, there is provided a coding apparatus for dividing a picture to form a matrix of blocks (macro blocks), each having a predetermined number of pixels, and conducting coding processes on moving picture data on a macro block by macro block basis, each being produced by the division, the apparatus including: a plurality of macro block processing sections for coding moving picture data concurrently on a macro block by macro block basis; and a state management section for managing the state of processing of each macro block in a single picture; the state management section being adapted to manage each macro block in a single picture in terms of being in a state where a process by the macro block processing section is completed (process completed state) or not; each macro block processing section being adapted to retrieve the state management section, detect a macro block not in a process completed state, execute a coding process on the detected macro block and bring the state of the macro block of the state management section into a process completed state upon ending the coding process on the macro block.

According to the present invention, there is provided a decoding apparatus for dividing a picture to form a matrix of blocks (macro blocks), each having a predetermined number of pixels, and conducting decoding processes on moving picture data on a macro block by macro block basis, each being produced by the division, the apparatus including: a plurality of macro block processing sections for decoding moving picture data concurrently on a macro block by macro block basis; and a state management section for managing the state of processing of each macro block in a single picture; the state management section being adapted to manage each macro block in a single picture in terms of being in a state where a process by the macro block processing section is completed (process completed state) or not; each macro block processing section being adapted to retrieve the state management section, detect a macro block not in a process completed state, execute a decoding process on the detected macro block and bring the state of the macro block of the state management section into a process completed state upon ending the decoding process on the macro block.

According to the present invention, there is provided a coding method of dividing a picture to form a matrix of blocks (macro blocks), each having a predetermined number of pixels, and conducting coding processes on moving picture data on a macro block by macro block basis, each being produced by the division, the method including the steps of: coding moving picture data by means of a plurality of macro block processing agents adapted to concurrently conduct coding processes on a macro block by macro block basis; and managing the state of processing of each macro block in a single picture in terms of being in a state where a process by the macro block processing agent is completed (process completed state) or not; each macro block processing agent being adapted to detect a macro block not in a process completed state, execute a coding process on the detected macro block and bring the state of the macro block into a process completed state upon ending the coding process on the macro block.

According to the present invention, there is provided a decoding method of dividing a picture to form a matrix of blocks (macro blocks), each having a predetermined number of pixels, and conducting decoding processes on moving picture data on a macro block by macro block basis, each being produced by the division, the method including the steps of: decoding moving picture data by means of a plurality of macro block processing agents adapted to concurrently conduct decoding processes on a macro block by macro block basis; and managing the state of processing of each macro block in a single picture in terms of being in a state where a process by the macro block processing agent is completed (process completed state) or not; each macro block processing agent being adapted to detect a macro block not in a process completed state, execute a decoding process on the detected macro block and bring the state of the macro block into a process completed state upon ending the decoding process on the macro block.

Thus, a coding apparatus, a decoding apparatus, a coding method and a decoding method according to the invention use a plurality of macro block processing agents for conducting coding or decoding processes on a macro block by macro block basis and operate them concurrently for high speed processing. According to the invention, each macro block of a single picture is managed in terms of being in a process completed state or not. Additionally, according to the invention, each macro block processing agent executes a coding or decoding process on the detected macro block and, upon ending the coding or decoding process on the macro block, brings the state of the macro block into a process completed state.

As a result, according to the invention, it is possible to execute coding or decoding processes concurrently on macro blocks regardless of the applicable coding standard, which may be a standard that requires each macro block to have a dependency relationship of being dependent on the left, upper left, upper and upper right macro blocks or some other coding standard.

BRIEF DESCRIPTION OF THE DRAWINGS

FIG. 6 is a schematic illustration of an example of addressing a macro block in a picture;

FIG. 15 is a flowchart of the processing operation of checking if it is possible to code or decode the determined macro block (X0, Y0) or not;

FIG. 24 is a schematic illustration of the region defined by dividing a picture and virtually extended horizontally;

DETAILED DESCRIPTION OF THE PREFERRED EMBODIMENTS

Now, the present invention will be described in greater detail by referring to the accompanying drawings that illustrate an apparatus realized by applying a video codec adapted to code or decode macro blocks according to the H. 264/MPEG-4AVC Standard.

Overall Configuration (Component Blocks of Encoder)

Figure 1:
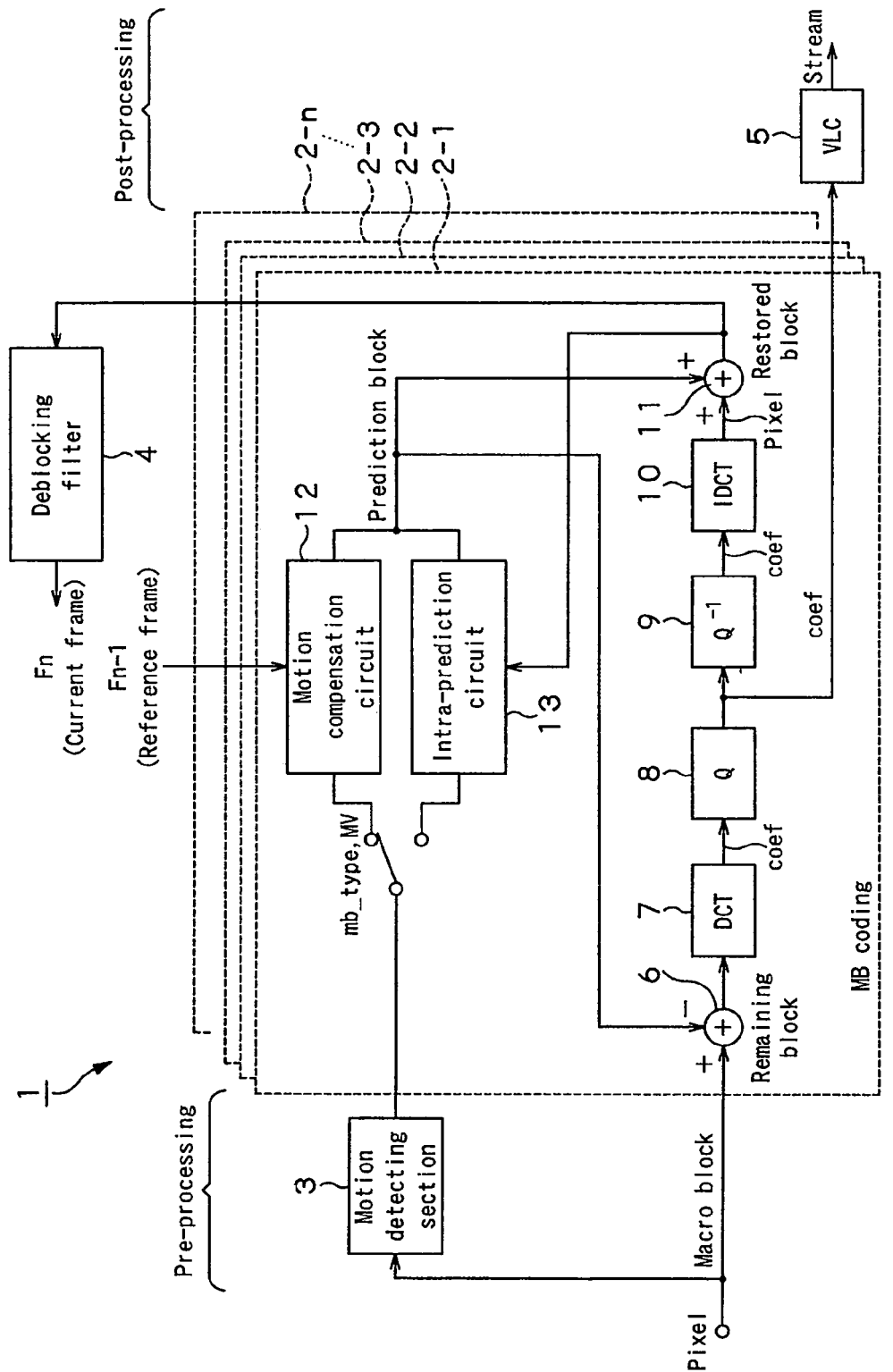
FIG. 1 is a schematic block diagram of the coding processor part (video encoder) of a video codec realized by applying the present invention.

FIG. 1 is a schematic block diagram of the coding processor part (video encoder 1) of a video codec realized by applying the present invention.

As shown in FIG. 1, the video encoder 1 receives pixel data (pixel) as input, executes a coding process conforming to the H. 264/MPEG-4AVC Standard and outputs a coded stream (stream).

The video encoder 1 comprises a plurality of MB coding sections 2 adapted to receive pixel data on a macro block by macro block basis as input and execute a coding process on the input macro block. The video encoder 1 also comprises a motion detecting section 3 for computationally determining a motion vector, a deblocking filter 4 for generating a frame as reference necessary for local decoding and a VLC section 5 for executing a variable length coding (VLC) process on the data column coded by the MB coding section 2.

As shown in FIG. 1, each of the MB coding sections 2 (2-1, 2-2, 2-3, . . . 2-n) has a subtraction circuit 6, a discrete cosine transformation (DCT) circuit 7, a quantization circuit 8, an inverse quantization circuit 9, an inverse discrete cosine transformation (IDCT) circuit 10, an addition circuit 11, a motion compensation circuit 12 and an intra-prediction circuit 13.

The subtraction circuit 6 is adapted to receive as input the picture data (pixels) of the spatial region to be coded on a macro block by macro block basis. When coding the macro block (pixel data) to be coded by utilizing the correlation among frames, it also receives as input a predictive block from the motion compensation circuit 12 or the intra-prediction circuit 13. The subtraction circuit 6 subtracts the predictive block from the input picture data when processing an inter-macro-block. The subtraction circuit 6 subtracts the predictive block from the input picture data when processing an intra-macro-block.

The DCT circuit 7 performs a discrete cosine transformation on the macro block (picture data) output from the subtraction circuit 6 and generates coefficient data (coef) of the DCT that are picture data of a frequency region. The DCT circuit 7 outputs the generated coefficient data (coef) to the quantization circuit 8.

The quantization circuit 8 executes a quantization process on the input coefficient data (coef), using predetermined quantization scale value.

The inverse quantization circuit 9 receives as input the coefficient data on the macro blocks of a frame that can be a reference data for inter-frame predictions out of the coefficient data output from the quantization circuit 8. The inverse quantization circuit 9 executes an inverse quantization process on the input data by means of the quantization scale value that is used for the above described quantization.

The IDCT circuit 10 performs an inverse discrete cosine transformation on the coefficient data (coef) output from the inverse quantization circuit 9 to generate picture data (pixels) of a spatial region.

The addition circuit 11 receives the picture data (pixels) output from the IDCT circuit 10. When the input picture data are macro blocks that are coded by utilizing the correlation among frames, the addition circuit 11 also receives as input the predictive block thereof from the motion compensation circuit 12 or the intra-block memory 13. When an inter-macro-block is processed, the addition circuit 11 adds the predictive block to the input picture data. When, on the other hand, an intra-macro-block is processed, the addition circuit 11 adds the predictive block to the input picture data. The addition circuit 11 supplies the picture data it outputs to the deblocking filter 4 and, after a deblocking filtering process, the picture data are stored in frame memory as reference frame (not shown).

The motion compensation circuit 12 provides motion compensation to the reference frame stored in the frame memory by referring to the motion vector and generates a predictive block. The intra-prediction circuit 13 performs intra predictions and stores an intra-macro-block to be used as predictive block. A predictive block is output either from the motion compensation block 12 or the intra-prediction circuit 13 depending on the type of macro-block and supplied to the subtraction circuit 6. The predictive block is supplied to the addition circuit 11.

Thus, the data (quantized coefficient data) output from the plurality of MB coding sections 2 (2-1, 2-2, 2-3, . . . 2-n) on a macro block by macro block basis are supplied to the VLC section 5.

(Process Flow of Encoder)

Figure 2:
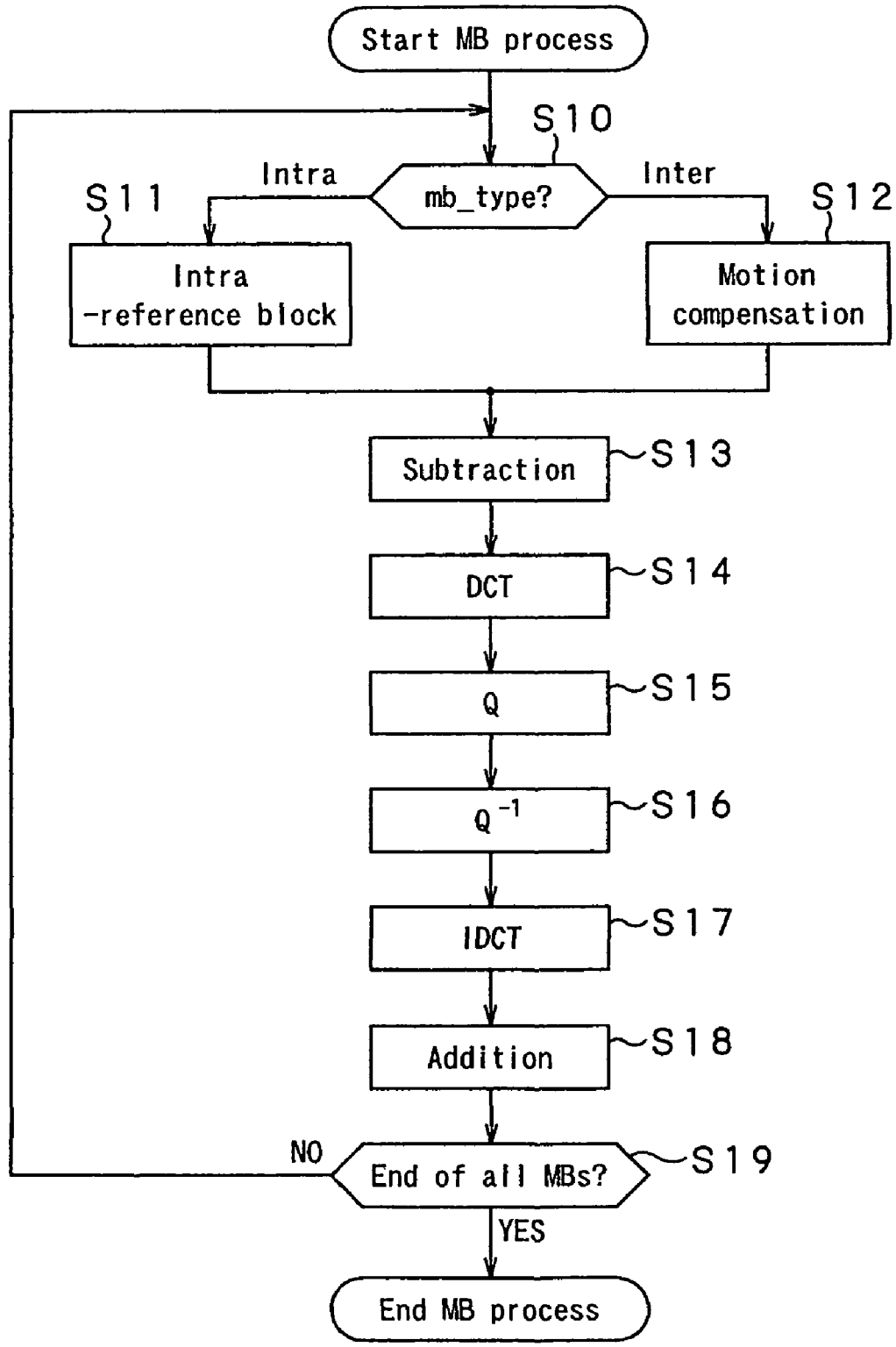
FIG. 2 is a flowchart of the processing operation of each MB coding section.

FIG. 2 is a flowchart of the processing operation of each MB coding section 2.

Referring to FIG. 2, as a macro block (pixel data) is input to each MB coding section 2, the latter determines the type of the macro block. More specifically, it determines if it is an intra-macro-block or an inter-macro-block (S10). If the intra-predictive-circuit is selected, it provides the outcome of prediction as predictive block (S11). If the input macro block is an intra-macro-block, it makes motion compensation for the outcome of the coding to generate a predictive block (S12). If, on the other hand, the input macro block is an intra-macro-block, it subtracts the predictive block from the input macro block and produces the difference block (S13).

Subsequently, each MB coding section 2 carries out a DCT computation (S14) and a quantization process (S15) on the pixel data that are input on a macro block by macro block basis. The data (coefficient data) that are subjected to DCT computation and quantization on a macro block by macro block basis are then supplied from the MB coding section 2 to the VLC section 5.

If a macro block is that of a frame where it can become reference data, each MB coding section 2 executes an inverse quantization process (S16) and an inverse DCT process (S17) and subsequently adds a predictive block to it (S18).

Then, each MB coding section 2 determines if all the macro blocks of a frame are processed or not (S19) and, if all the macro blocks are not processed yet, it repeats the processes from Step S10 but, if all the macro blocks are processed already, it ends and terminates the flow of operation.

(Component Blocks of Decoder)

Figure 3:
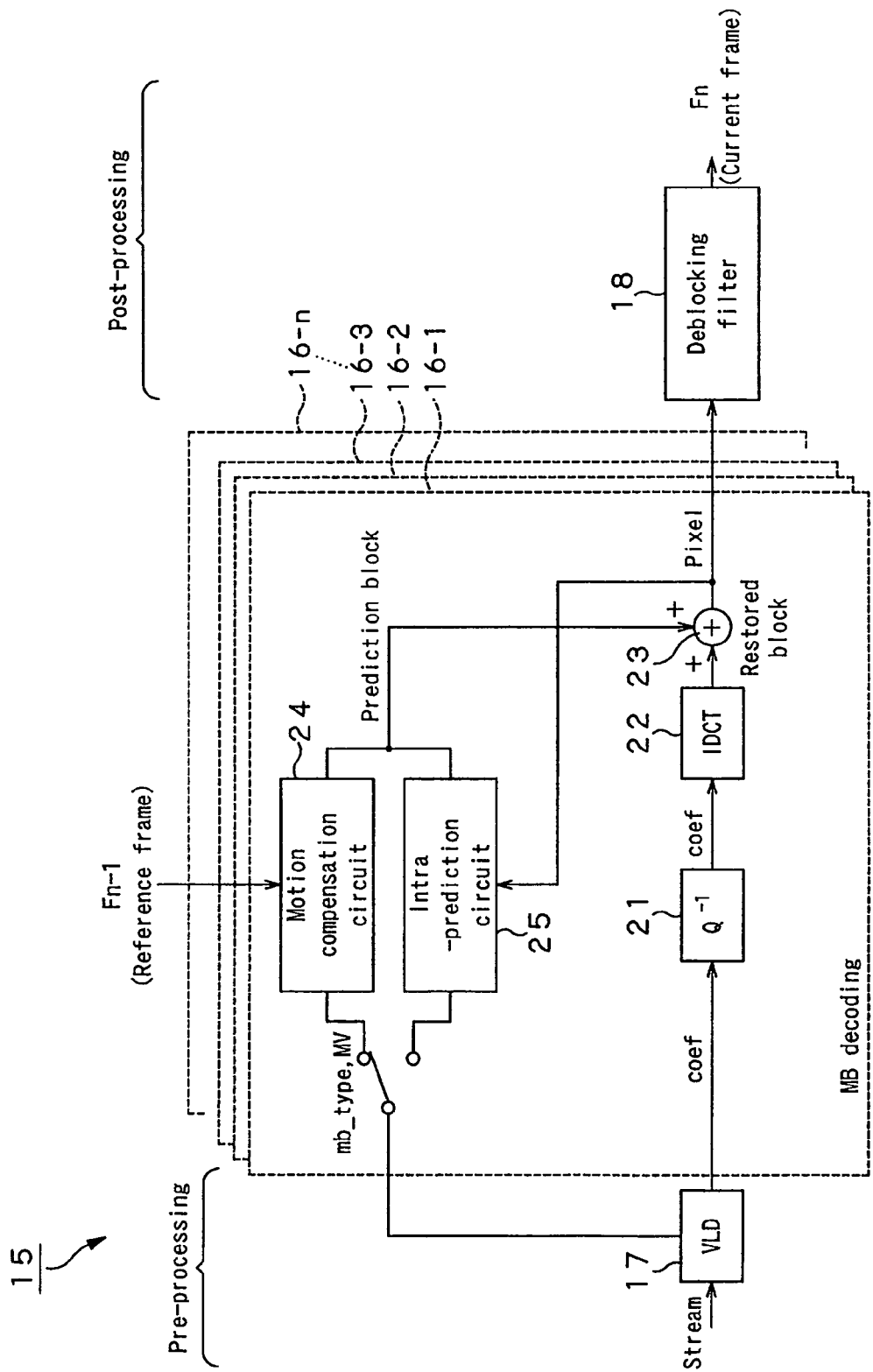
FIG. 3 is a schematic block diagram of the decoding processor part (video decoder) of a video codec realized by applying the present invention.

FIG. 3 is a schematic block diagram of the decoding processor part (video decoder 15) of a video codec realized by applying the present invention.

Referring to FIG. 3, the video decoder 15 is adapted to receive as input a coded stream (stream), executes a decoding process conforming to the H. 264/MPEG-4AVC Standard and output pixel data (pixel).

The video decoder 15 comprises a plurality of MB decoding sections 16, each being adapted to receive coefficient data that are quantized on a macro block by macro block basis and execute a decoding process on the coefficient data that are quantized on a macro block by macro block basis. The video decoder 15 also comprises a VLD section 17 for decoding variable length codes (VLD) on the input coded stream (stream) and outputting quantized coefficient data and a motion vector and a deblocking filter 18 for executing a deblocking filtering process of eliminating block noises from the pixel data that are coded by the MB decoding section 16 and input to it on a macro block by macro block basis.

As shown in FIG. 3, each of the MB decoding sections 16 (16-1, 16-2, 16-3, ..., 16-n) has an inverse quantization circuit 21, an inverse discrete cosine transformation (IDCT) circuit 22, an addition circuit 23, a motion compensation circuit 24 and an intra-block memory 25.

The inverse quantization circuit 21 receives as input the coefficient data (coef) out of the coded data of variable length codes from the VLD section 17. The inverse quantization circuit 21 executes an inverse quantization process on the input data.

The IDCT circuit 22 performs an inverse discrete cosine transformation on the coefficient data (coef) input from the inverse quantization circuit 21 to generate picture data (pixel) of a spatial region.

The addition circuit 23 receives the picture data (pixel) output from the IDCT circuit 22. If the input picture data is a macro block that is coded by utilizing the correlation among frames, the addition circuit 23 also receives as input a predictive block from the motion compensation circuit 24 or the intra-prediction circuit 25. When processing an intra-macroblock, the addition circuit 23 adds a predictive block to the input picture data. When processing an inter-macro-block, the addition circuit 23 adds a predictive block to the input picture data. The addition circuit 23 supplies the picture data it outputs to the deblocking filter 18, which picture data are stored in a frame memory as reference frame after the deblocking filtering process.

The motion compensation circuit 24 provides motion compensation to the reference frame stored in the frame memory by referring to the motion vector and generates a predictive block. The intra-prediction circuit 25 does not perform motion compensation and stores an intra-macro-block to be used as predictive block. A predictive block is output either from the motion compensation circuit 24 or the intra-block memory 25 depending on the type of macro-block and the predictive block that becomes a reference picture is supplied to the addition circuit 23.

Thus, all the picture data (pixel) output from the plurality of MB decoding sections 16 (16-1, 16-2, 16-3, ..., 16-n) on a macro block by macro block basis are supplied to the deblocking filter 18.

(Process Flow of Decoder)

Figure 4:
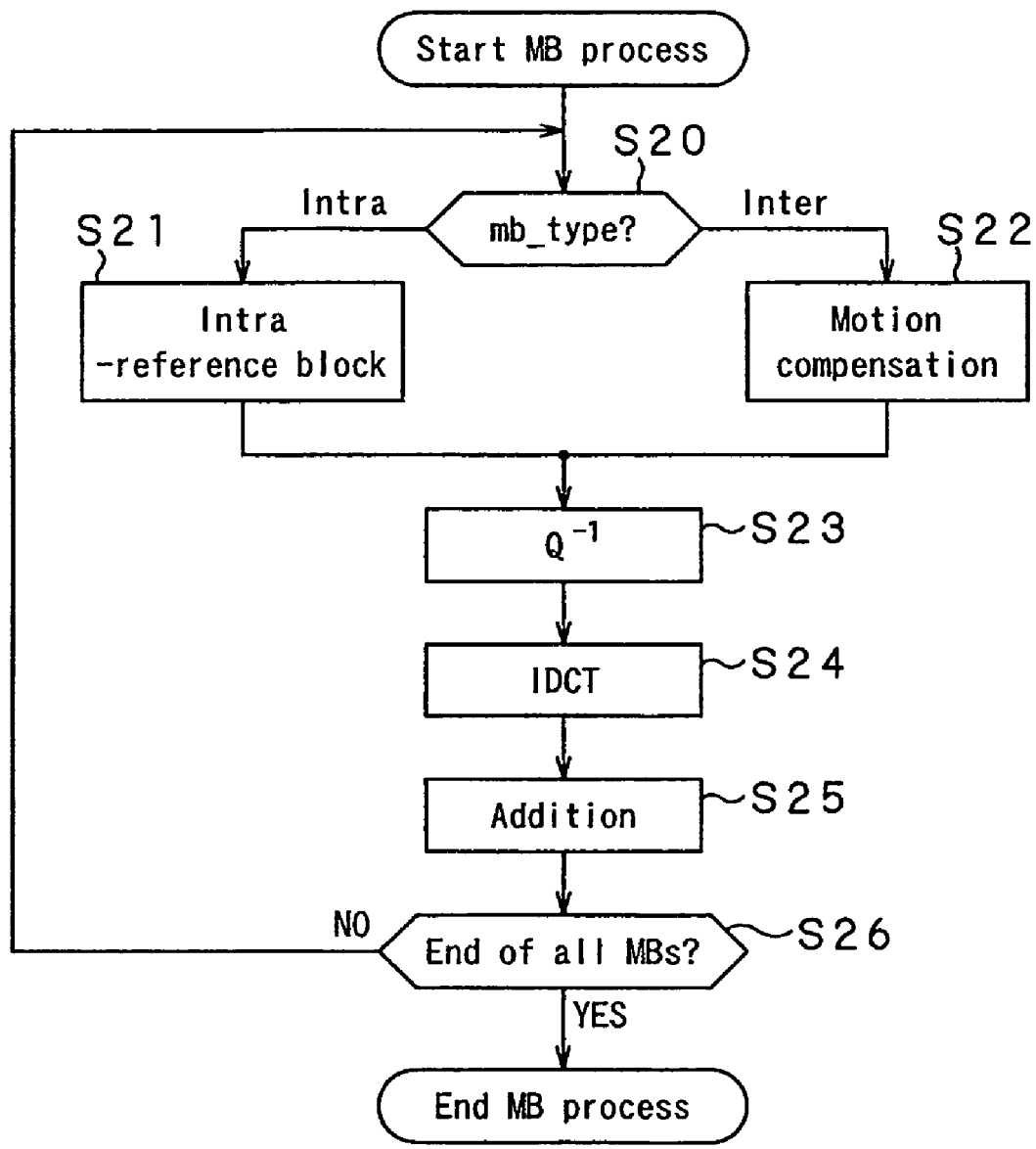
FIG. 4 is a flowchart of the operation of each MB decoding section, showing the processing operation thereof.

FIG. 4 is a flowchart of the processing operation of each MB decoding section 16.

Referring to FIG. 4, as a macro block (coefficient data) is input to each MB decoding section 16, the latter determines the type of the macro block. More specifically, it determines if it is an intra-macro-block or an inter-macro-block (S20). If the input macro block is an intra-macro-block, it does not generate a predictive block (S21). If, on the other hand, the input macro block is an intra-macro-block, it makes motion compensation to generate a predictive block (S22).

Subsequently, each MB decoding section 16 carries out an inverse quantization process (S23) and an inverse DCT process (S24) on the input coefficient data and adds a predictive block (S25).

Then, each MB decoding section 16 determines if all the macro blocks of a frame are processed or not (S26) and, if all the macro blocks are not processed yet, it repeats the processes from Step S20 but, if all the macro blocks are processed already, it ends and terminates the flow of operation.

MB Processing Agents and State Management Section

The motion detecting section 3 functions as pre-processing section for the plurality of MB coding sections 2 (2-1, 2-2, 2-3, ..., 2-n). More specifically, the motion detecting section 3 is a coding processing section that operates for coding on a frame by frame basis before the processing operation that is conducted on a macro block by macro block basis. The VLC section 5 and the deblocking filter 4 function as post-processing section that operates for the plurality of MB coding sections 2 (2-1, 2-2, 2-3, ... 2-n). Moe specifically, the VLC section 5 and the deblocking filter 4 operate as coding processing section that operates for coding on a frame by frame basis after the processing operation that is conducted on a macro block by macro block basis.

In the video decoder 15, the VLD section 17 functions as pre-processing section for the plurality of MB decoding sections 16 (16-1, 16-2, 16-3, ... 16-n). More specifically, the VLD section 17 operates as decoding processing section that operates for decoding on a frame by frame basis before the processing operation that is conducted on a macro block by macro block basis. In the video decoder 15, the deblocking filter 18 functions as post-processing section for the plurality of MB decoding sections 16 (16-1, 16-2, 16-3, ..., 16-n). More specifically, the deblocking filter 18 operates as processing section that operates decoding processing section that operates for decoding on a frame by frame basis after the processing operation that is conducted on a macro block by macro block basis.

In the following description, the MB coding section 2 and the MB decoding section 16 are collectively referred to as "MB processing agent 30" and the motion detecting section 3 and the VLD section 17 are collectively referred to as "pre-processing section 31", while the VLC section 5, the deblocking filter 4 and the deblocking filter 18 are collectively referred to as "post-processing section 32".

The video codec realized by applying the present invention comprises a state management section 33 that operates so that optimum macro blocks may be selected when the plurality of MB processing agents 30 (30-1, 30-2, 30-3, ... 30-n) process macro blocks.

Figure 5A:
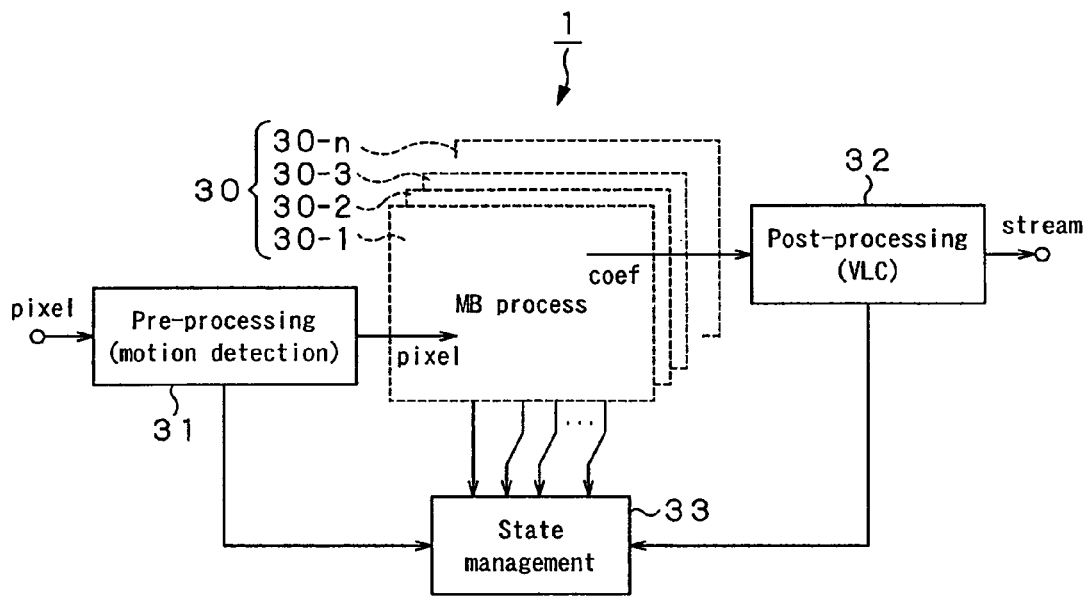
FIG. 5 is a schematic block diagram of a video codec realized by applying the present invention and divided to produce macro block processing sections, a pre-processing section and a post-processing section.
Figure 5B:
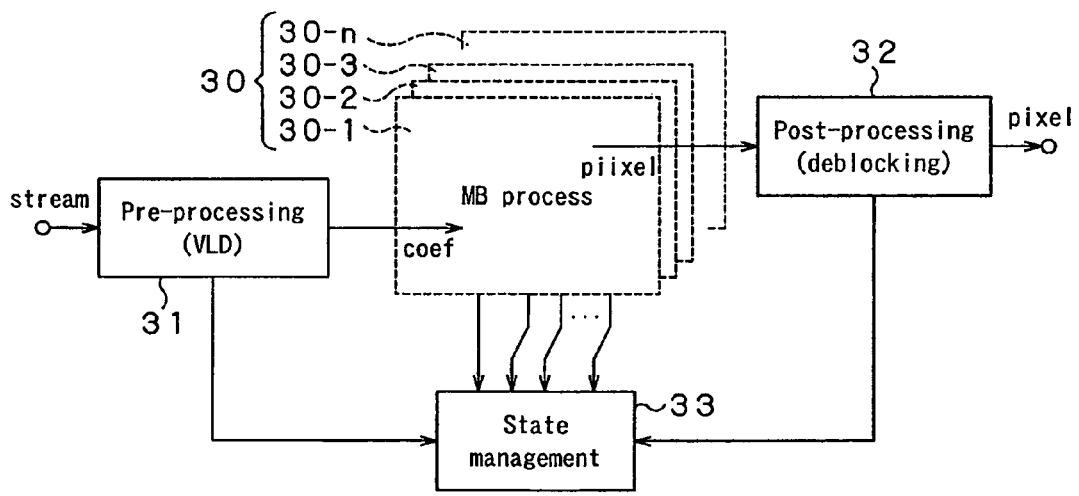

The plurality of MB processing agents 30 (30-1, 30-2, 30-3, ..., 30-n) independently access the state management section 33. Similarly, as shown in FIG. 5(A), the pre-processing section 31 (motion detection) and the post-processing section 32 (VLC, deblocking) of the video encoder 1 independently access the state management section 33. As shown in FIG. 5(B), the pre-processing section 31 (VLD) and the post-processing section 32 (deblocking) of the video decoder 2 independently access the sate management section 33.

State Management Section

Now, the state management section 33 will be described below.

The state management section 33 manages the current state of the macro blocks that exist in a picture (a frame).

(Addressing Example)

The state management section 33 addresses the macro blocks in the picture and manages them.

Figure 6:
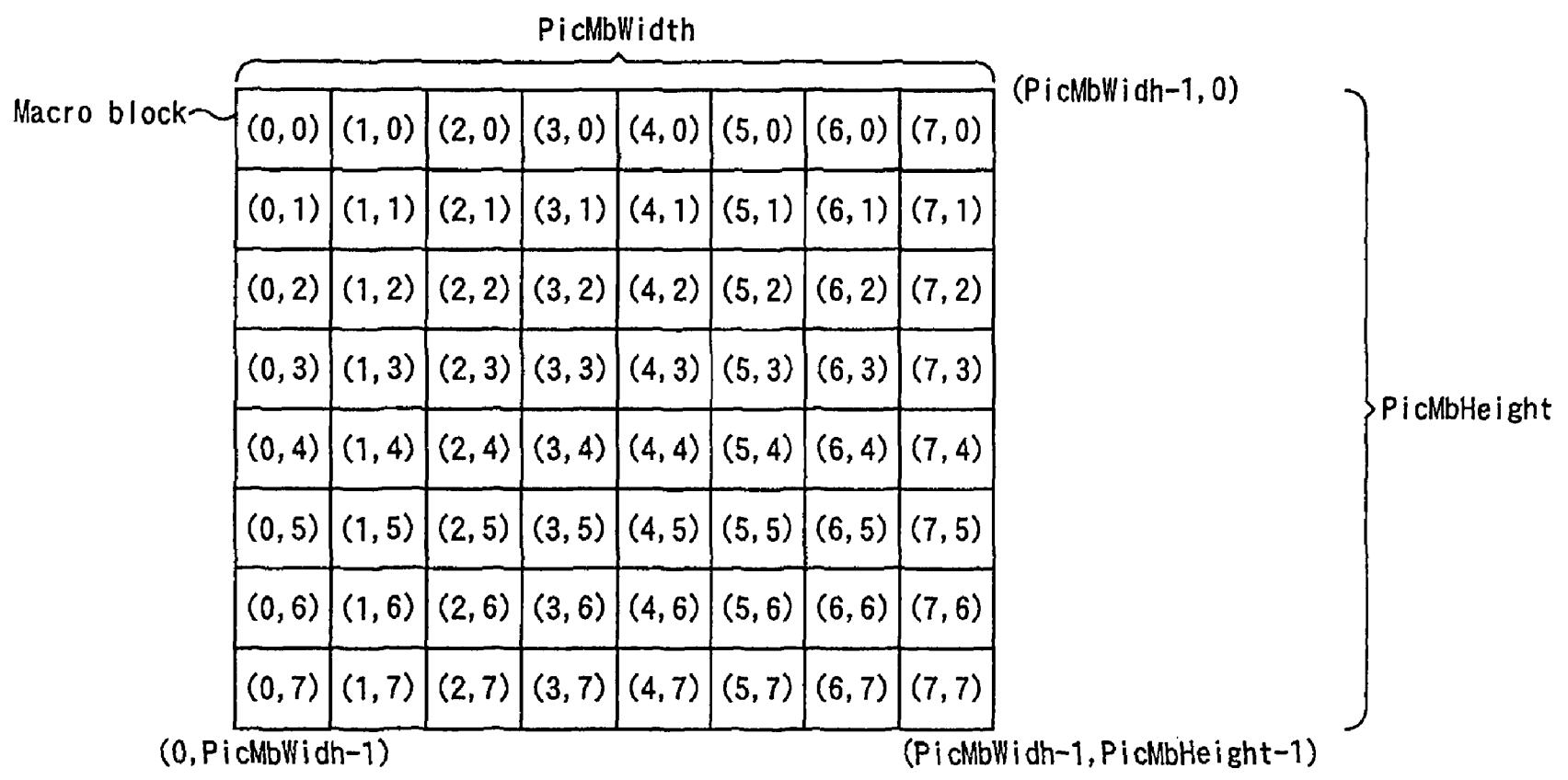

As shown in FIG. 6, macro blocks are arranged to form a matrix in a picture as shown in FIG. 6. The macro block located at the position on the (x+1)-th column as counted from the left end column and on the (y+1)-th row as counted from the top row is expressed by (x, y). Therefore, if macro blocks are arranged to form a matrix of PicMbWidth columns and PicMbheight rows, the left top macro block, or the macro block of the first column and the first row is expressed by (0, 0) and the right bottom macro block is expressed by (PicMbWidth−1, PicMbHeight−1).

(Four States of Macro Blocks)

The state management section 33 manages the state of each of the macro blocks arranged to form a matrix as described above, which may be one of four states including an "initial state (S00)", a "ready state (S01)", an "executing state (S02)" and a "process completed state (S03)".

The "initial state (S00)" is literally an initial state. A macro block that is in an "initial state (S00)" is not processed at all by the MM processing agents 30 and the pre-processing by the pre-processing section 31 is not completed. The MB processing agents 30 cannot process (in other words, code or decode) any macro block that is in an initial state (S00).

The "ready state (S01)" is a state where the pre-processing operation of the pre-processing section 31 is completed and a process (a coding process or a decoding process) can be started for a macro block. The pre-processing operation of the pre-processing section 31 is completed for a macro block that is in a "ready state (S01)" but the MB processing agents 30 do not process the macro block at all. The MB processing agents 30 can process (in other words, code or decode) a macro block in a ready state (S01).

The "executing state (S02)" is a state where one of the MB processing agents 30 is executing a process (a coding process or a decoding process) for a macro block. The MB processing agent 30 has started a coding or decoding process on a macro block in an "executing state (S02)" but has not completed the process yet. The MB processing agents 30 cannot start a new process (a coding process or a decoding process) for a macro block that is in an executing state (S02).

The "process completed state (S03)" is a state where the process (the coding or decoding process) by the MB processing agent 30 is completed and a post-processing operation can be started for a macro block. The MB processing agent 30 has completed the process i.e., the coding or decoding process and the post-processing section 32 can start a post-processing operation for the macro block on a macro block is a "process completed state (S03)". The MB processing agents 30 cannot start a new process (a coding process or a decoding process) for a macro block that in a process completed state (S03).

The MB processing agents 30, the pre-processing section 31 and the post-processing section 32 can refer to the state of each macro block when they access the state management section 33. Additionally and if necessary, the MB processing agents 30, the pre-processing section 31 and the post-processing section 32 can bring each state into transition.

(Transition of the State of Arbitrarily Selected Macro Block)

Figure 7:
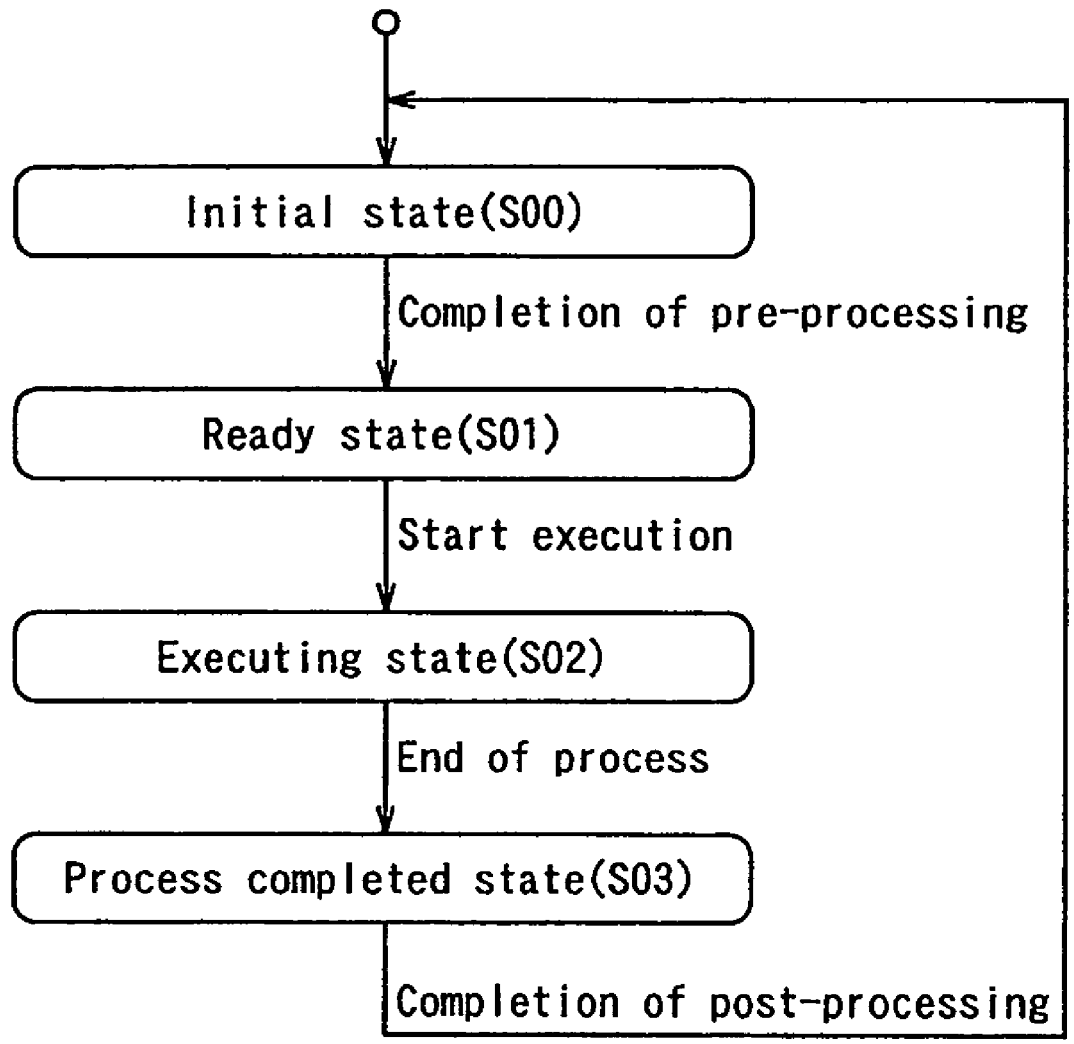
FIG. 7 is a state chart illustrating the state of transition of an arbitrarily selected macro block.

FIG. 7 is a state chart illustrating the state of transition of an arbitrarily selected macro block.

As an operation of coding or decoding a picture is started, the macro block is moved into an initial state (S00).

In the initial state (S00), the macro block is subjected to a pre-processing operation of the pre-processing section 31. As the pre-processing operation is completed for the macro block, the macro block is moved from the initial state (S00) into a ready state (S01).

The MB processing agents 30 retrieve the macro block that is in the ready state (S01) and, as they detect the macro block in the ready state (S01), they starts a process (a coding process or a decoding process) for the macro block. As they start a process i.e., a coding process or a decoding process, the macro block is moved from the ready state (S01) into an executing state (S02).

In the executing state (S02), the macro block is subjected to a processing operation of one of the MB processing agents 30. As the processing operation (a coding process or a decoding process) is completed for the macro block, the macro block is moved from the executing state (S02) in to a process completed state (S03).

In the process completed state (S03), the macro block is subjected to a post-processing operation of the post-processing section 32. As the post-processing operation is completed for the macro block, the macro block is moved from the process completed state (S03) into an initial state (S00).

The state management section 33 manages the state of each macro block that is moved in a manner as described above.

(Relationship of the States in Slice, Table Expression using the Relationship)

According to the MPEG-2 Standard, the MPEG-4 Standard and the H. 264/MPEG-4AVC Standard, each macro block has a dependency relationship with the left side macro block without fail.

Figures 8A, 8B:
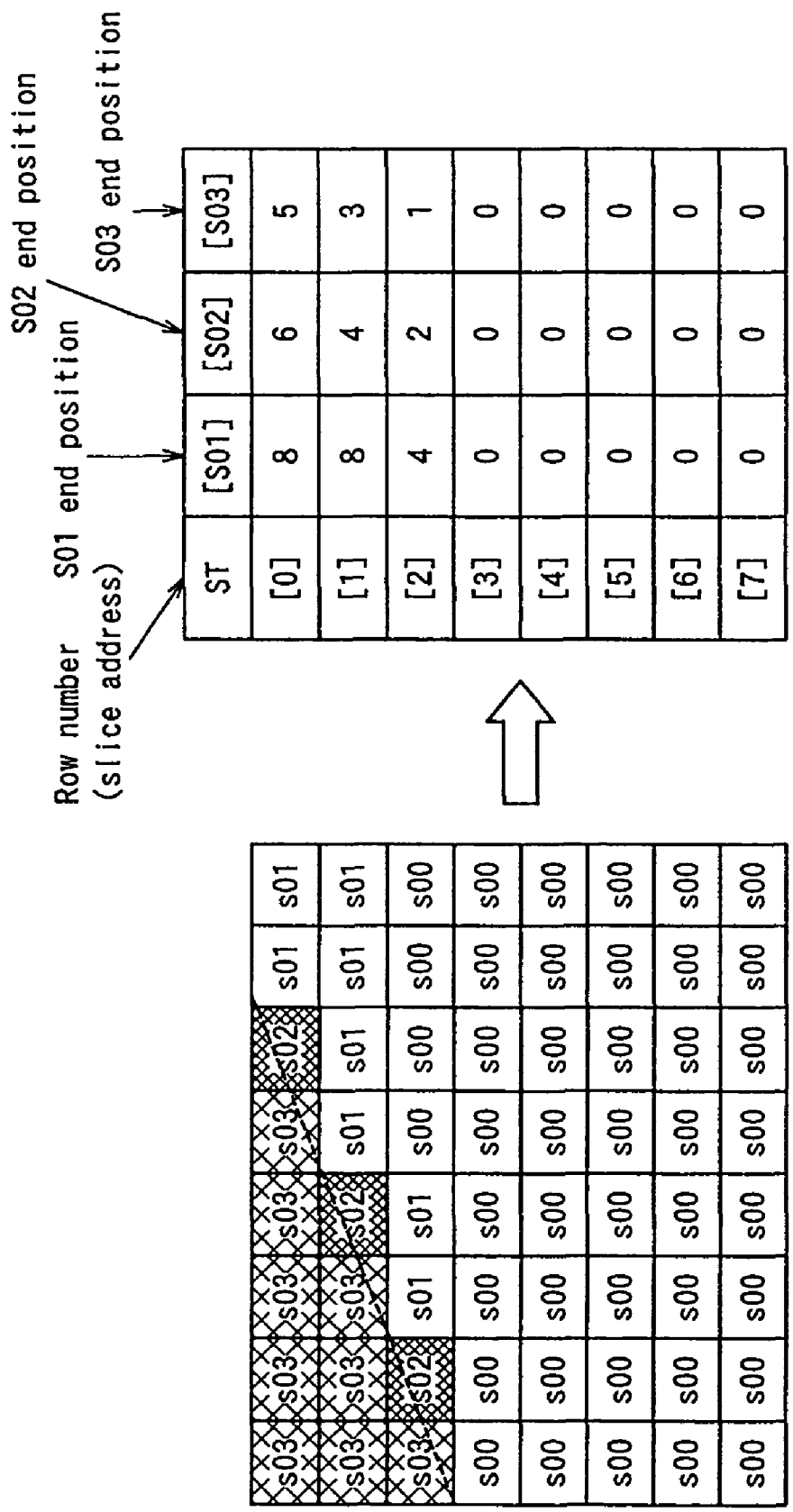
FIG. 8 is a schematic illustration of the states of the macro blocks in a picture.

Therefore, if an arbitrarily selected macro block is in a "ready state (S01)", it is never moved into an "executing state (S02)" unless at least the left side macro block is in a "process completed state (S03). In other words, when the state of one of the macro blocks that are arranged to form a matrix is reviewed in the group of macro blocks that are arranged on the same row (slice), the left side macro block is in the same state or in an advanced state as shown in FIG. 8(A). In other words, the states of the macro blocks of a slice advance sequentially from the state of the left end macro block.

The state management section 33 manages the advancement of the state of each of the macro blocks of each slice according to the above described rule of advancement of state.

More specifically, as shown in FIG. 8(B), the state management section 33 is realized in the form of a table that shows the end position of the ready state (S01), that of the executing state (S02) and that of the process completed state (S03) for the address of each slice in a picture.

The end position of the ready state (S01) specifically refers to the number of the macro block that is the right end one of the macro blocks in the ready state (S01) as counted from the left end of the picture.

The end position of the executing state (S02) specifically refers to the number of the macro block that is the right end one of the macro blocks in the executing state (S02) as counted from the left end of the picture.

The end position of the process completed state (S03) specifically refers to the number of the macro block that is the right end one of the macro blocks in the process completed state (S03) as counted from the left end of the picture.

The state management section 33 manages the state of each of the macro blocks in a manner as described above in order to minimize the required memory capacity.

To describe the information managed by the state management section 33, the following expression will be used.

$$ST[S\#][y] \tag{11}$$

In the formula (11), # represents 01, 02 or 03 and y represents an integer not smaller than 0.

The formula (11) indicates the right end position of the macro blocks that are in the state of "#" for the row number Y (slice address=Y).

Assume that the following expression (12) is given.

$$ST[S01][2] \tag{12}$$

Then, the formula (12) indicates the number of the right end macro block of the macro blocks in the ready state (S01) of the second row as counted from the left end of the picture. In the instance of FIG. 8, ST [S01] [2]=4.

Processing Flow of Codec

Now, the processing sequence of a video codec realized by applying the present invention will be described below.

(Main Flow)

Figure 9:
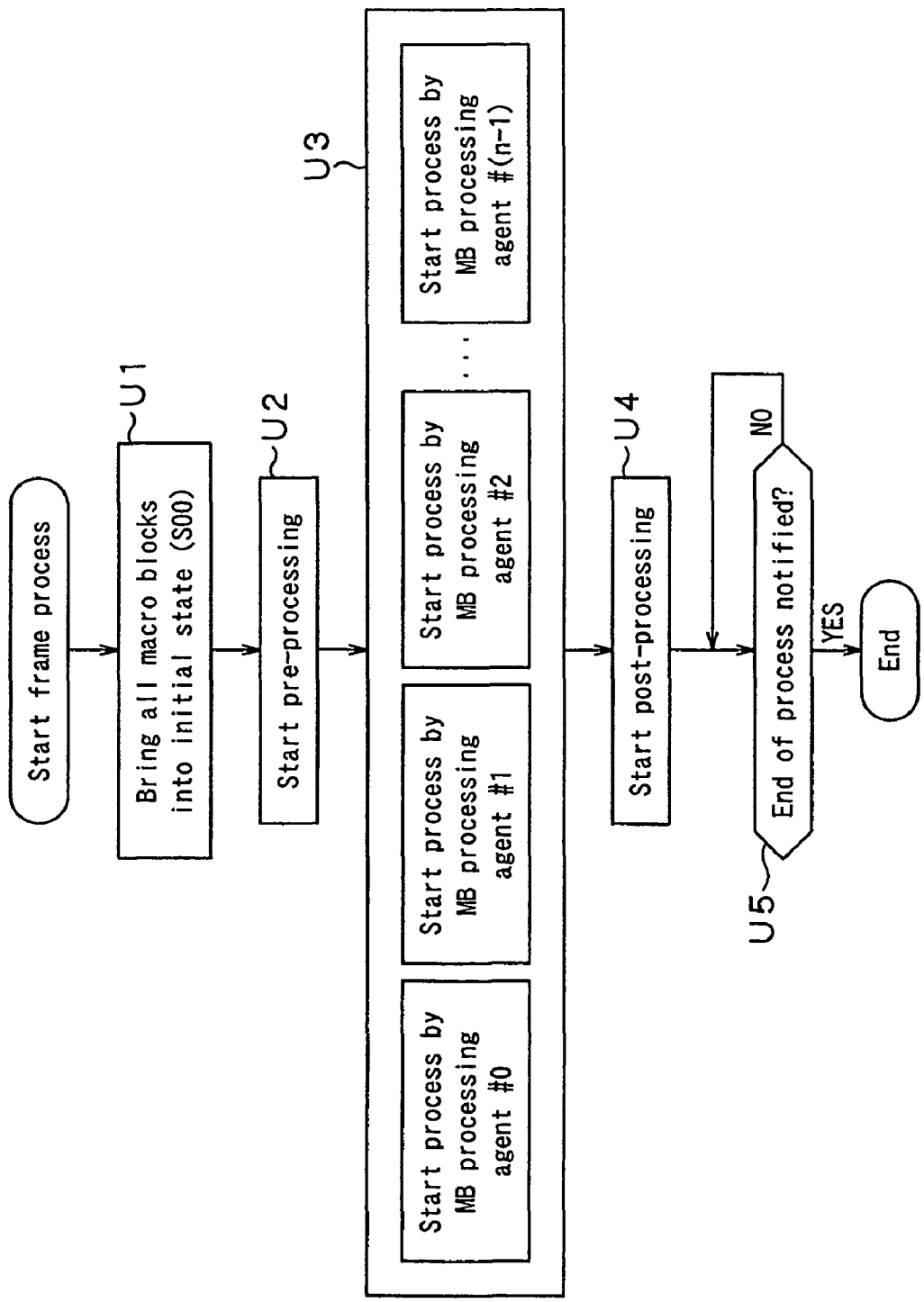
FIG. 9 is a flowchart of the main processing operation of a video codec realized by applying the present invention.

FIG. 9 is a flowchart of the main processing operation of a video codec realized by applying the present invention.

As a coding or decoding process starts, the video codec of the present invention begins to operate with the process from Step U1.

Firstly, in Step U1, the state management section 33 brings all the macro blocks into an initial state (S00).

Then, in Step U2, the pre-processing section 31 starts a pre-processing operation.

Thereafter, in Step U3, all the MB processing agents 30 start a coding or decoding process.

Subsequently, in Step U4, the post-processing section 32 starts a post-processing operation.

Then, in Step U5, the video codec of the present invention determines if a process end notification is generated from the post-processing section 32 or not and, if it determines that a process end notification is generated, it ends the coding or decoding process of the frame.

(Pre-Processing Flow)

Figure 10:
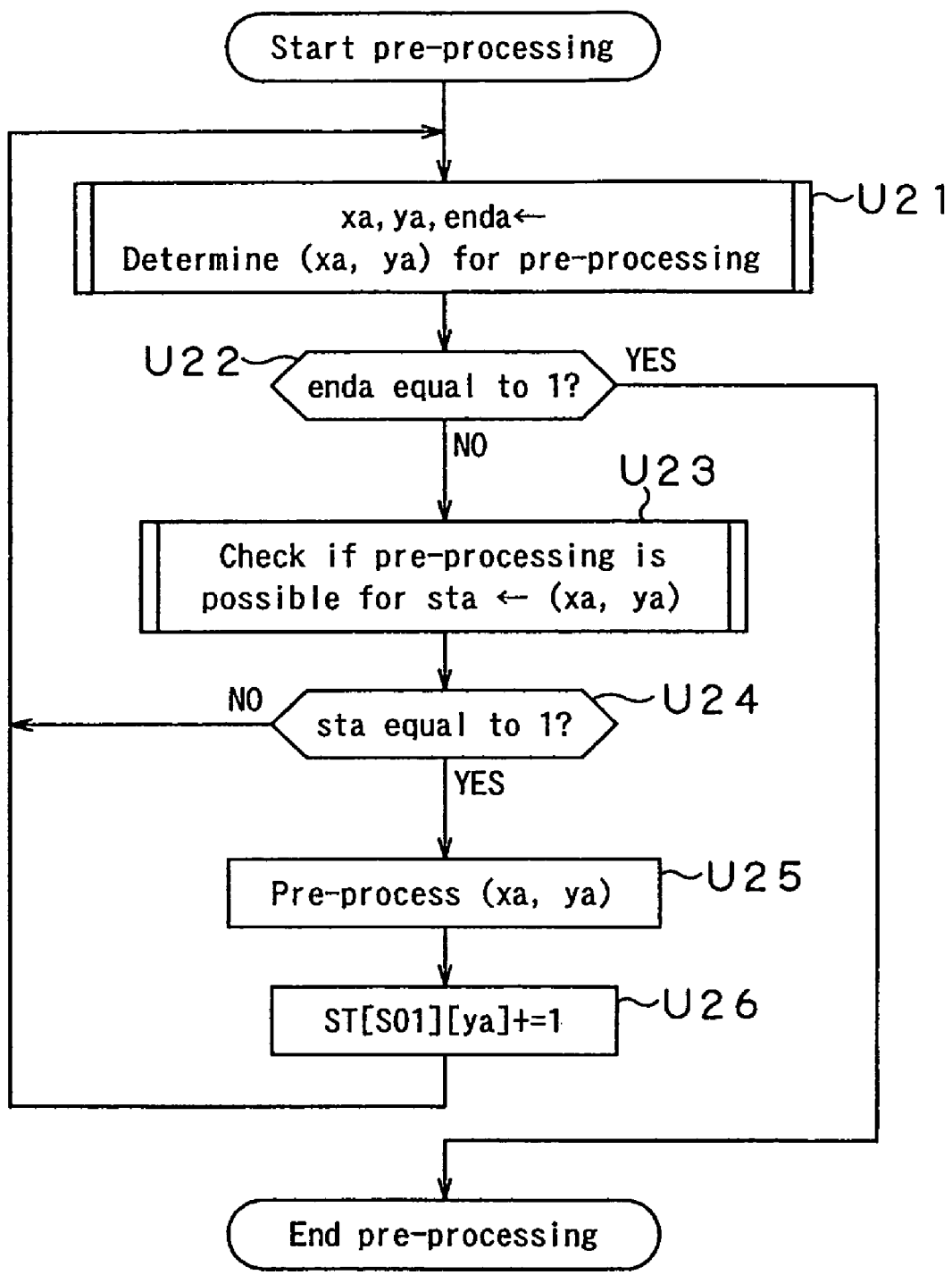
FIG. 10 is a flowchart of the pre-processing operation in the main flow of operation.

FIG. 10 is a specific flowchart of the pre-processing operation (Step U2) in the main flow of operation.

The variables that are used in the description of the pre-processing flow are listed below.

(Xa, Ya): the macro block that is the object of pre-processing sta: a flag that indicates if pre-processing is enabled or not 1 indicates that pre-processing is enabled. 0 indicates that pre-processing is disabled.

enda: a flag that indicates if pre-processing ends or not 1 indicates that pre-processing ends. 0 indicates that pre-processing does not end.

In Step U21, the pre-processing section 31 determines a macro block (Xa, Ya) that is the object of a pre-processing operation. More specifically, the pre-processing section 31 selects a macro block out of all the macro blocks in a frame (in a picture). The pre-processing section 31 starts selection from the macro block of the upper left end of the picture and moves along the macro blocks on a one by one basis from left to right and from above to below according to the sequence of so-called raster scanning. When the selected macro block (Xa, Ya) goes beyond the last macro block (lower right end macro block) in the picture, the flag enda is made equal to 1. When, on the other hand, the selected macro block (Xa, Ya) does not go beyond the last macro block, the flag enda remains equal to 0.

Then, in Step U22, the pre-processing section 31 determines if the flag enda is equal to 1 or not. If the flag enda is equal to 1, it passes through the pre-processing flow and ends the processing operation. If the flag enda is equal to 0, it proceeds to the next step, or Step U23.

In the next step, or in Step U23, the pre-processing section 31 checks if the macro block (Xa, Ya) can be subjected to a pre-processing operation or not. If the pre-processing section 31 finds that the macro block can be subjected to a pre-processing operation as a result of the checking step, it substitutes 1 for the flag sta. If, on the other hand, the pre-processing section 31 finds that the macro block cannot be subjected to pre-processing operation as a result of the checking step, the pre-processing section 31 substitutes 0 for the flag sta.

Then, in Step U24, the pre-processing section 31 determines if the flag sta is equal to 1 or not. If the flag sta is equal to 0, it returns to Step U21. If, on the other hand, the flag sta is equal to 1, it proceeds to the next step, or Step U25.

Subsequently, in Step U25, the pre-processing section 31 performs a pre-processing operation on the macro block (Xa, Ya).

Thereafter, in Step U26, the pre-processing section 31 accesses the state management section 33 and has it move the state of the macro block (Xa, Ya) from the initial state (S00) into a ready state (S01). In other words, it executes a process expressed by formula (21) below. Note that formula "A+=1" means that the value of A is incremented by 1.

$$ST[01][Ya] += 1 \qquad (21)$$

As the processing operation of Step U26 ends, the pre-processing section 31 returns to Step U21 and carries out the processing operation of Steps U21 through U26 on the next macro block.

(Processing Flow of MB Processing Agents)

Figure 11:
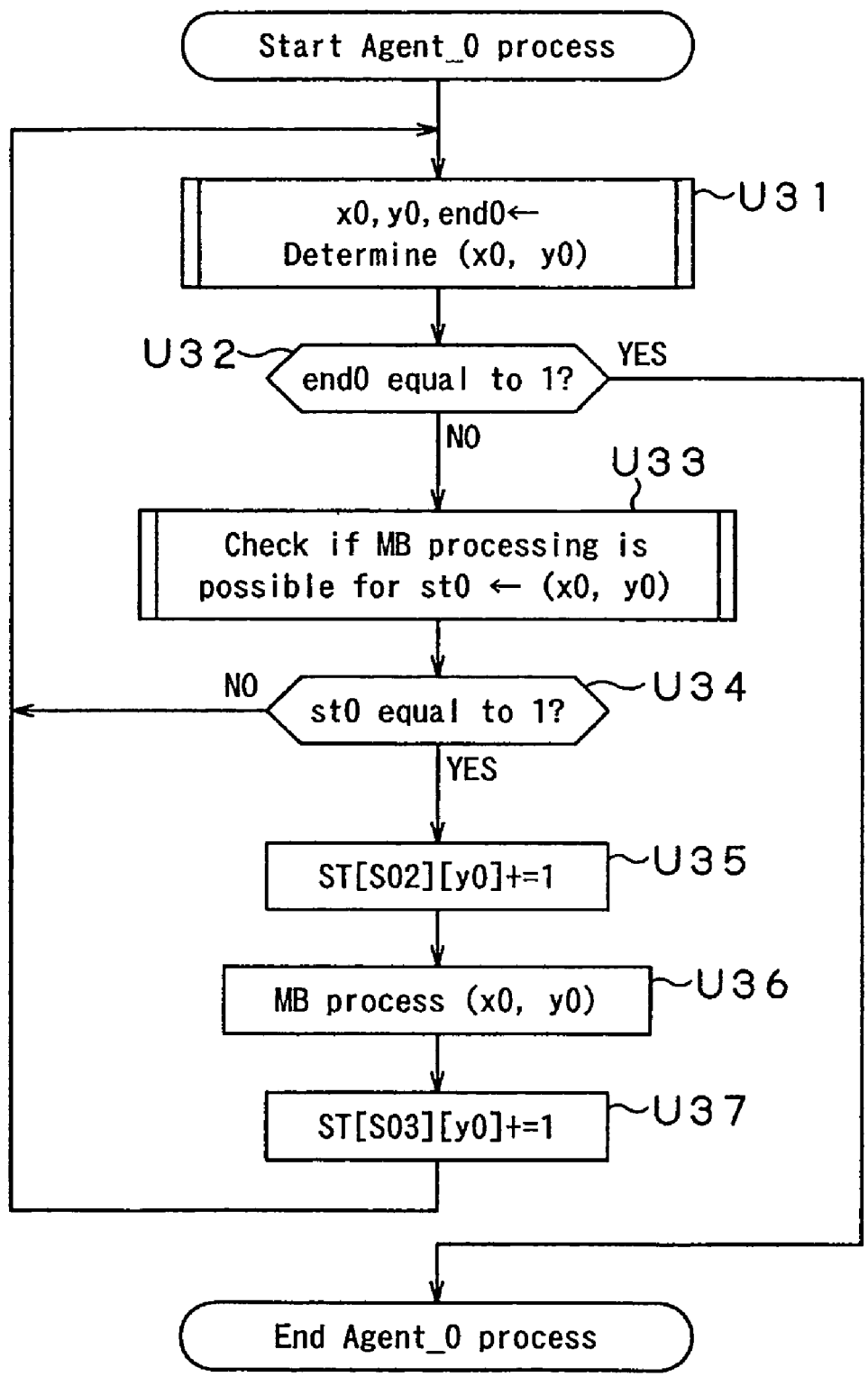
FIG. 11 is a flowchart of the coding or decoding process (Step U3) of an MB processing agent in the main flow of operation.

FIG. 11 is a flowchart of the coding or decoding process (Step U3) of an MB processing agent in the main flow of operation.

While the processing flow of the MB processing agent #0 is described below. A similar processing flow also applies to all the remaining MB processing agents (#1 through #(n−1)). All the MB processing agents (#0 through #(n−1)) execute the respective processes concurrently and independently.

The variables that are used in the description of the processing flow of the MB processing agent are listed below.

PicMbHeight: the number of macro blocks on each vertical line of a picture (a frame)

PicMbWidth: the number of macro blocks on each horizontal line of a picture (a frame)

The variables that are different for each of the MB processing agents are listed below.

(X0, Y0): the macro block to be coded or decoded by the MB processing agent #0 st0: a flag that indicates that the MB processing agent #0 can code or decode the macro block or not 1 indicates that the MB processing agent can code or decode it. 0 indicates that the MB processing agent cannot code or decode it.

end0: a flag that indicates the end of coding or decoding by the MB processing agent #0

1 indicates that the coding or decoding is ended. 0 indicates that the coding or decoding is not ended.

Firstly, in Step U31, the MB processing agent 30 determines a single macro block (X0, Y0) to be coded or decoded. The MB processing agent 30 selects the macro block from all the macro blocks in a frame (picture). Additionally, the MB processing agent 30 raises 1 for the flag end0 when the coding or decoding of the macro block (X0, Y0) is ended relative to all the macro blocks in the picture, whereas it raises 0 for the flag end0 when the coding or decoding of the macro block (X0, Y0) is not ended.

The processing operation of Step U31 will be described in greater detail hereinafter.

Subsequently, in Step U32, the MB processing agent 30 determines if the flag end0 is equal to 1 or not. If the flag end0 is equal to 1, it moves through the coding or decoding flow and ends the process. If, on the other hand, the flag end0 is equal to 0, it proceeds to the next step, or Step U33.

In the next step, or Step U33, the MB processing agent 30 checks if the macro block (X0, Y0) can be coded or decoded. If the MB processing agent 30 finds that the macro block can be coded or decoded as a result of the checking step, it substitutes 1 for the flag st0. If, on the other hand, the MB processing agent 30 finds that the macro block cannot be coded or decoded as a result of the checking step, it substitutes 0 for the flag st0.

The processing operation of Step U33 will also be described in greater detail hereinafter.

Thereafter, in Step U34, the MB processing agent 30 determines if the flag st0 is equal to 1 or not. If the flag st0 is equal to 0, it returns to Step U31. If, on the other hand, the flag st0 is equal to 1, it proceeds to the next step, or Step U35.

Subsequently, in Step U35, the MB processing agent 30 accesses the state management section 33 and has it move the state of the macro block (X0, Y0) from the ready state (S01) into an executing state (S02). In other words, it executes a process expressed by formula (22) below.

$$ST[02][Y0] += 1 \tag{22}$$

Then, in Step U36, the MB processing agent 30 codes or decodes the macro block (X0, Y0). In other words, the macro blocks are coded or decoded on a macro block by macro block basis.

As the processing operation of Step U36 ends, the MB processing agent 30 accesses the state management section 33 and has it move the state of the macro block (X0, Y0) from the executing state (S02) into a process completed state (S03). In other words, it executes a process expressed by formula (23) below.

$$ST[03][Y0] += 1 \tag{23}$$

As the processing operation of Step U37 ends, the MB processing agent 30 returns to Step U31 and executes the process of Step U31 through U37 on the next macro block.

(Process of Determining the Macro Block to be Processed)

Figure 12:
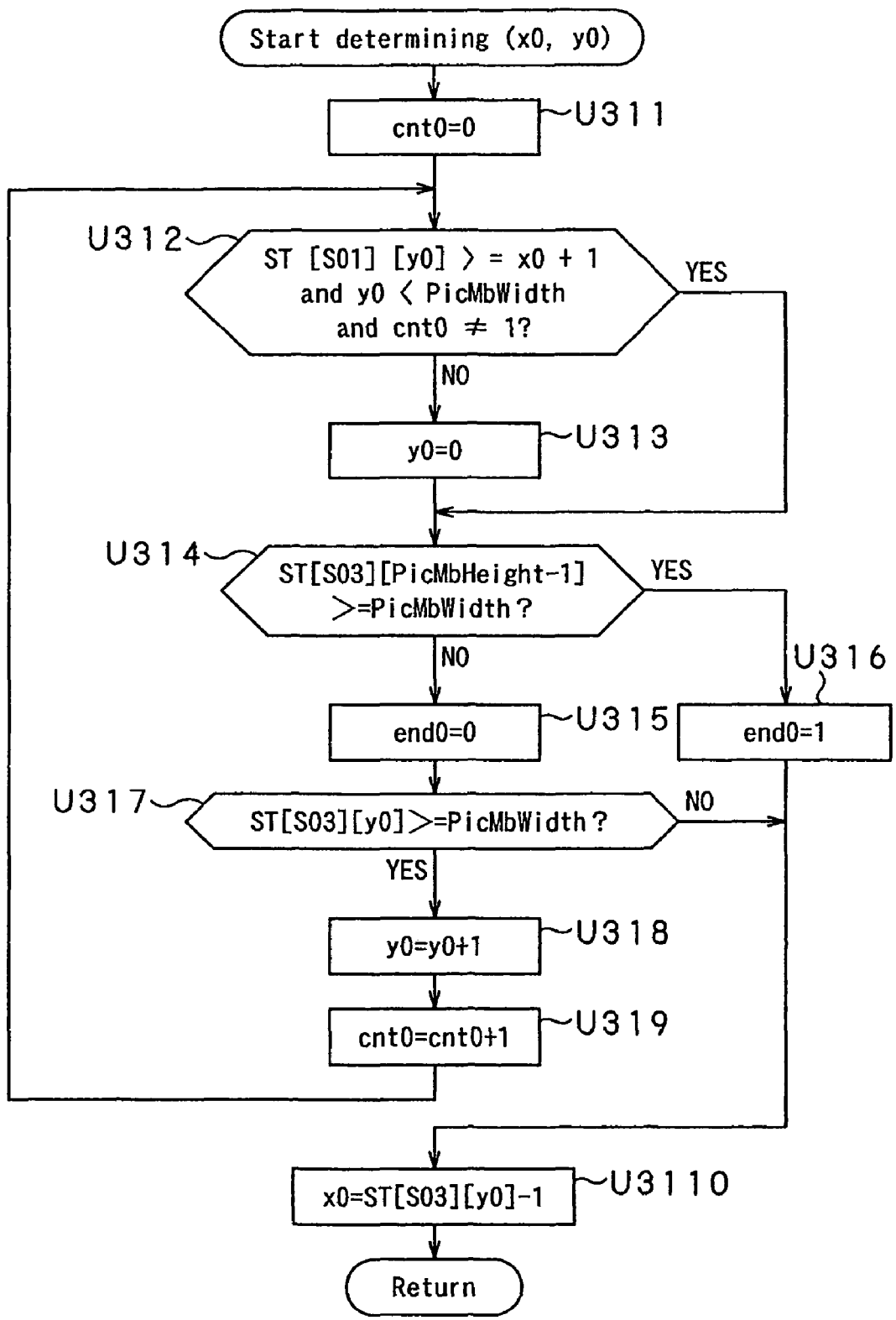
FIG. 12 is a flowchart of the process of determining a macro block (X0, Y0) in the processing operation of an MB processing agents in the main flow of operation.

FIG. 12 is a flowchart of the process (Step U31) of determining a macro block (X0, Y0) in the processing operation of an MB processing agents in the main flow of operation.

Firstly, in Step U311, the MB processing agent 30 substitutes 0 for variable cnt. The variable cnt shows the number of the macro blocks that are retrieved for determining a single macro block in the process of determining the macro block.

Then, in the next step, or Step U312, the MB processing agent 30 determines if equation (24) below is true or false.

$$\{ST[S01][Y0] \geq (X0+1)\} \text{ AND } \{X0 < \text{PicMbWidth}\} \text{ AND } \{cnt0 \neq 1\} \tag{24}$$

In the formula (24), the expression of ST [S01] [Y0]>(X0+1) holds true when the right side macro block that is immediately adjacent to the macro block (X0, Y0) that is currently being processed is in a ready state (S01). The expression of X0<PicMbWidth holds true when the macro block (X0, Y0) that is currently being processed is the right end macro block of the picture. The expression of cnt0≠1 holds true when the number of retrieved macro blocks is not equal to 1 in the macro block determining process.

The MB processing agent 30 proceeds to Step U314 if the equation (24) is true, whereas it proceeds to Step U313 if the equation (24) is false.

Subsequently, in Step U313, the MB processing agent 30 makes the value of "Y0" equal to 0. In other words, it defines that the macro block (X0, Y0) to be retrieved as a macro block on the uppermost row of the picture.

Then, in Step U314, the MB processing agent 30 determines if equation (25) below is true or false.

$$ST[S03][\text{PicMbHeight}-1] \geq \text{PicMbWidth} \tag{25}$$

The equation (25) holds true when all the macro blocks of the lowermost slice are in a process completed state (S03). In other words, the equation means if all the macro blocks of the picture (frame) are coded or decoded or not.

If all the macro blocks are not coded or decoded yet, the MB processing agent 30 proceeds to Step U315, where it substitutes 0 for the flag end0. Then, it proceeds to Step U317.

If, on the other hand, all the macro blocks are coded or decoded, the MB processing agent 30 proceeds to Step U316, where it substitutes 1 for the flag end0. Then, it proceeds to Step U3110.

Subsequently, in Step U317, the MB processing agent 30 determines if equation (26) below is true or false.

$$ST[S03][Y0] \geq \text{PicMbWidth} \tag{26}$$

The equation (26) means that it holds true if all the macro blocks of the slice that includes the macro block (X0, Y0) in question are already coded or decoded.

If all the macro blocks of the slice that include the macro block (X0, Y0) in question are not coded or decoded yet, the MB processing agent 30 proceeds to Step U3110.

If, on the other hand, all the macro blocks of the slice that include the macro block (X0, Y0) in question are coded or decoded already, the MB processing agent 30 increments the value of y0 by 1 in Step U318 and then it increments the value of the variable cnt by 1 in Step U319. Then, it returns to Step U312 to repeat the processing operation of Steps U312 through U319.

In Step U3110, the MB processing agent 30 substitutes the value of equation (27) below for X0 and ends the process.

$$X0 = ST[03][Y0] - 1 \tag{27}$$

As a result of the processing operation from Steps U311 to U3110, it is possible to determine the macro block (X0, Y0) to be coded or decoded by the MB processing agent 30.

Figure 13:
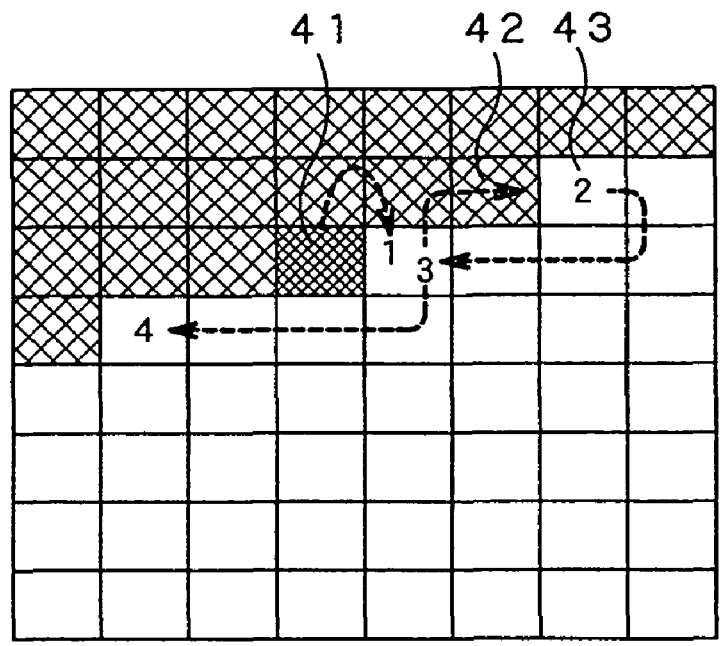
FIG. 13 is a schematic illustration of the retrieval sequence of the process of determining a macro block.

More specifically, as a result of the processing operation from Steps U311 to U3110, the MB processing agent 30 retrieves the macro block in a manner as illustrated in FIG. 13.

Assume here that the MB processing agent 30 codes or decodes a macro block 41. When the MB processing agent 30 processes the next macro block, it checks if the macro block 42 at the right side of the macro block 41 that is processed immediately before can be processed or not. If it is found that the right side macro block 42 cannot be processed, the MB processing agent 30 moves to the uppermost slice and moves sequentially to lower slices on a one by one basis to check if there is a macro block that can be processed or not.

This operation is conducted for the reason as described below.

Since the macro block (X0, Y0) in question at present is already coded or decoded by itself (MB processing agent 30), it is highly possible that the right side macro block 42 can be processed. Therefore, the MB processing agent 30 firstly checks the right side macro block. It is desirable to start retrieving macro blocks from the right side macro block because it is not necessary to update the header information at the time of coding or decoding a macro block of the same slice.

Additionally, in the case of the MPEG-4 and the H. 264/MPEG-4AVC Standard, the processing operation proceeds from upper right to lower left due to the dependency relationship, it is desirable select macro blocks in such a way that the processing operation proceeds from above to below.

Thus, the processing operation can progress efficiently when it is conducted in a manner as described above for this embodiment.

Figure 14:
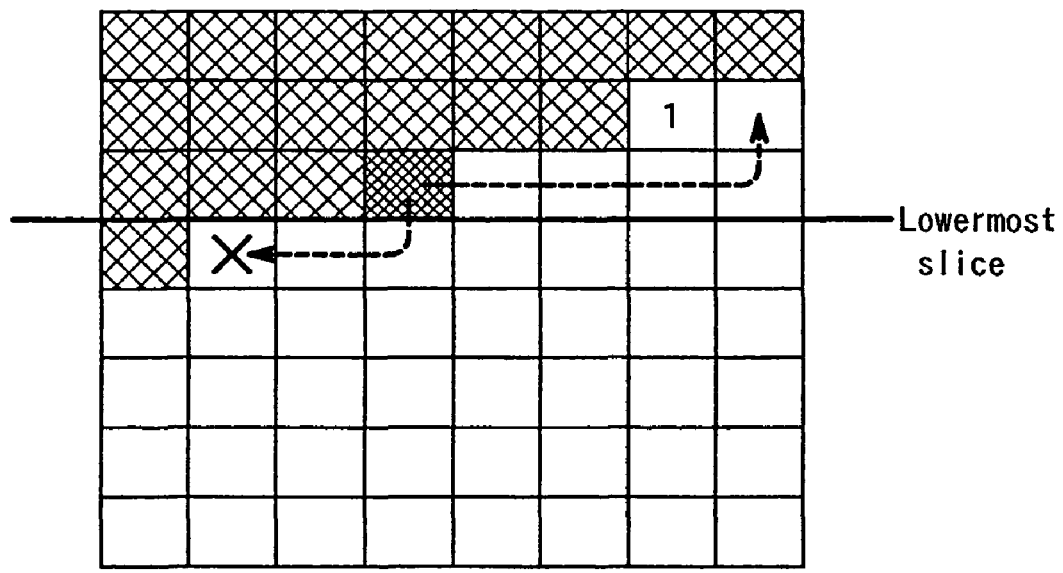
FIG. 14 is a schematic illustration of the retrieval sequence when defining the lowermost slice to be looked into.

While the MB processing agent 30 checks if a macro block can be processed or not over the entire picture, it may alternatively be so arranged that the lowermost slice to be checked is defined and the slices located below the defined slice is not selected, for example, as shown in FIG. 14. With this arrangement of defining the scope of selection, it is possible to further reduce the capacity of the memory for holding the macro blocks that have been coded or decoded.

(Process of Determining the Macro Block to be Processed)

FIG. 15 is a flowchart of the processing operation of checking if it is possible to code or decode the determined macro block (X0, Y0) or not (Step U33).

Firstly, in the case of the MPEG-4 and the H. 264/MPEG-4AVC Standard, the macro block of (X, Y) can be processed only on condition that the left, upper left, upper and upper right macro blocks have already been coded or decoded as shown in the upper center box of FIG. 15.

In other words, the macro block of (X, Y) can be processed on condition that:

The upper right macro block has been coded or decoded. Therefore, T [03] [Y−1]>X+1 holds true.
The left macro block has been coded or decoded. Therefore, T [03] [Y]>X−1 holds true.
The own macro block is ready for coding or decoding. Therefore, T [01] [Y]>X holds true.

Thus, when coding or decoding according to the MPEG-4 or the H. 264/MPEG-4AVC Standard, the MB processing agent 30 checks if formula (26) shown below holds true or not by referring to the state management section 33 as shown in the flowchart (U331) of the upper right box in FIG. 15. It raises 1 as flag st0 if the formula holds true, whereas it raises 0 as flag st0 if the formula is false.

$$\{ST[S03][Y-1]>(X+1)\} \text{ AND } \{ST[S03][Y]>(X-1) \text{ AND } \{ST[S01][Y]>X\} \quad (26)$$

In the case of MPEG-2, the macro block of (X, Y) can be processed on condition that the operation of coding or decoding the left side macro block is completed as shown in the lower center box of FIG. 15.

In other words, the macro block of (X, Y) can be processed on condition that:

The left side macro block has been coded or decoded. Therefore T [03] [Y]>X−1 holds true.
The own macro block is ready for coding or decoding. Therefore, T [01] [Y]>X holds true.

Thus, when coding or decoding according to the MPEG-2, the MB processing agent 30 checks if formula (27) shown below holds true or not by referring to the state management section 33 as shown in the flowchart (U332) of the lower right box in FIG. 15. It raises 1 as flag st0 if the formula holds true, whereas it raises 0 as flag st0 if the formula is false.

$$\{\{ST[S03][Y]>(X-1)\} \text{ AND } \{ST[S01][Y]>X\} \quad (27)$$

Thus, MB processing agent 30 selects either Step U331 or Step U332 depending on the coding process it performs according to the MPEG-2 Standard, the MPEG-4 Standard or the H. 264/MPEG-4AVC Standard. Therefore, the MB processing agent 30 can adapt itself to any of the coding standards simply switching Step U33 without changing any other steps.

(Post-Processing Flow)

Figure 16:
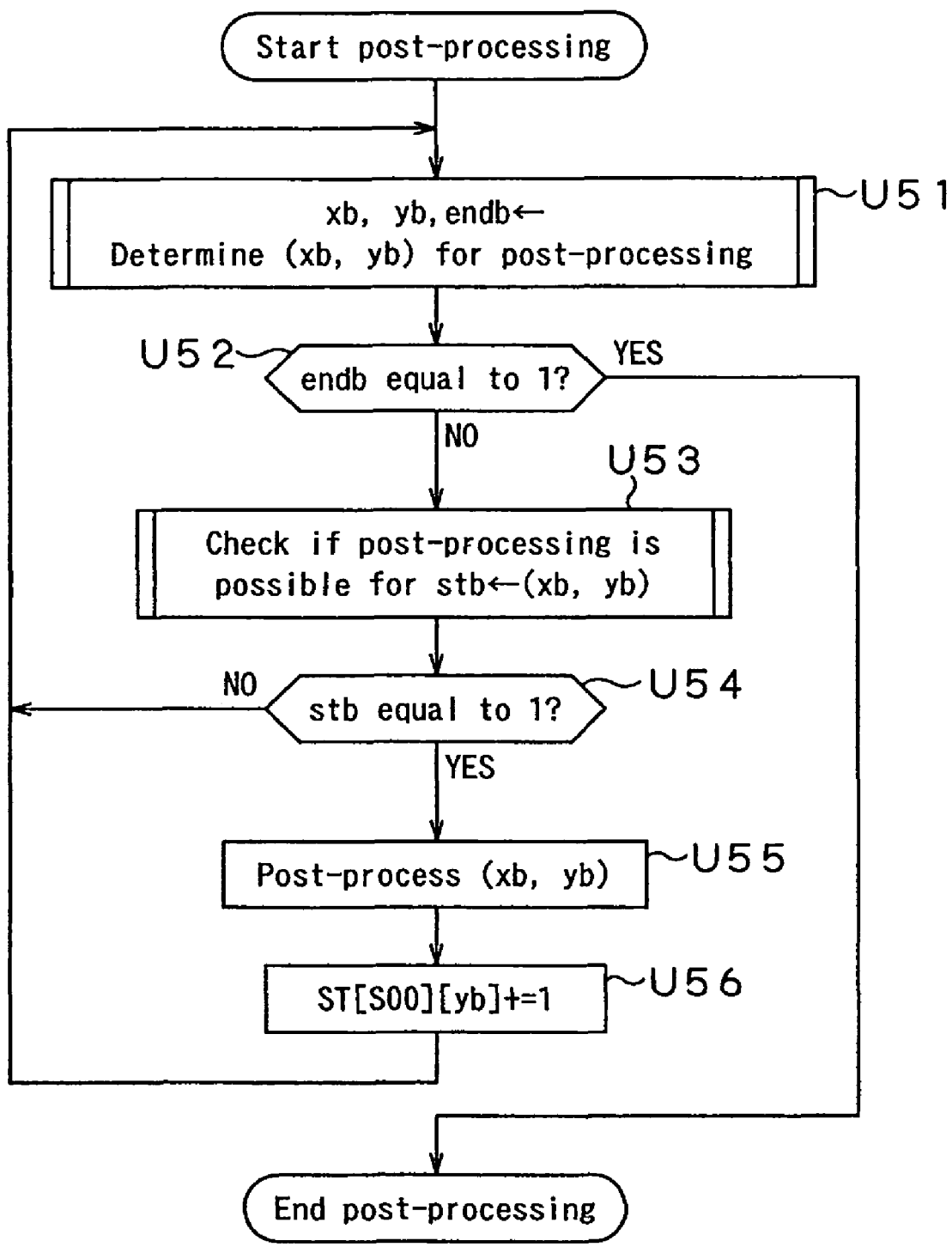
FIG. 16 is a flowchart of the post-processing operation in the main flow of operation.

FIG. 16 is a specific flowchart of the post-processing operation (Step U5) in the main flow of operation.

The variables that are used in the description of the post-processing flow are listed below.

(Xb, Yb) the macro block that is the object of post-processing
stb: a flag that indicates if post-processing is enabled or not
1 indicates that post-processing is enabled. 0 indicates that post-processing is disabled.
endb: a flag that indicates if post-processing ends or not
1 indicates that post-processing ends. 0 indicates that post-processing does not end.

Firstly in Step U51, the post-processing section 31 determines a macro block (Xb, Yb) that is the object of a post-processing operation. More specifically, the post-processing section 31 selects a macro block out of all the macro blocks in a frame (in a picture). The post-processing section 31 starts from the macro block of the upper left end of the picture and moves along the macro blocks on a one by one basis from left to right and from above to below according to the sequence of so-called raster scanning. When the selected macro block (Xb, Yb) goes beyond the last macro block (lower right end macro block) in the picture, the flag endb is made equal to 1. When, on the other hand, the selected macro block (Xb, Yb) does not go beyond the last macro block, the flag endb remains equal to 0.

Then, in Step U52, the post-processing section 31 determines if the flag endb is equal to 1 or not. If the flag endb is equal to 1, it passes through the post-processing flow and ends the processing operation. If the flag endb is equal to 0, it proceeds to the next step, or Step U53.

In the next step, or in Step U53, the post-processing section 31 checks if the macro block (Xb, Yb) can be subjected to a post-processing operation or not. If the post-processing section 31 finds that the macro block can be subjected to a post-processing operation as a result of the checking step, it substitutes 1 for the flag stb. If, on the other hand, the post-processing section 31 finds that the macro block cannot be subjected to post-processing operation as a result of the checking step, the post-processing section 31 substitutes 0 for the flag stb.

Then, in Step U54, the post-processing section 31 determines if the flag stb is equal to 1 or not. If the flag stb is equal to 0, it returns to Step U51. If, on the other hand, the flag stb is equal to 1, it proceeds to the next step, or Step U55.

Subsequently, in Step U55, the post-processing section 31 performs a post-processing operation on the macro block (Xb, Yb).

Thereafter, in Step U56, the post-processing section 31 accesses the state management section 33 and has it move the state of the macro block (Xb, Yb) from the process completed state (S03) into an initial state (S00). In other words, it executes a process expressed by formula (28) below.

$$ST[00][Yb]+=1 \quad (28)$$

As the processing operation of Step U56 ends, the post-processing section 31 returns to Step U51 and carries out the processing operation of Steps U51 through U56 on the next macro block.

(Outcome of Processing)

Figure 17:
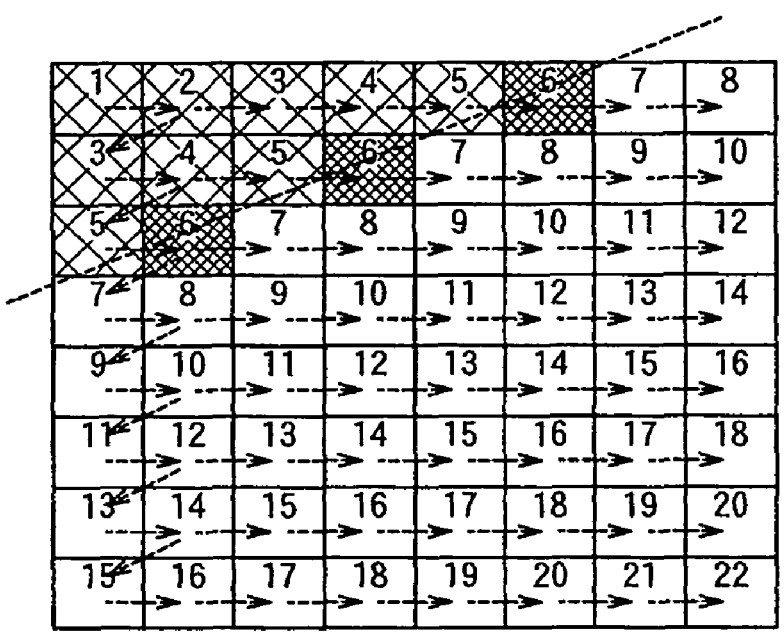
FIG. 17 is a schematic illustration of the progress of the concurrent processes of a video codec realized by applying the present invention according to the MPEG-4 Standard or the H. 264/MPEG-4AVC Standard.

Thus, the processing operation proceeds in an inclined direction as shown in FIG. 17 as the video codec of the present invention operates in a manner as described above according to the MPEG-4 Standard or the H. 264/MPEG-4AVC Standard.

More specifically, each MB processing agent 30 codes or decodes the macro blocks of a slice sequentially from the left end. At the same time, it codes or decodes at a timing delayed by the time period necessary for the operation of coding or decoding a macro block relative to the immediately above slice.

Thus, if macro blocks that are dependent on the left, upper left, upper and upper right macro blocks are coded or decoded as in the case of a coding or decoding operation according to the MPEG-4 Standard or the H. 264/MPEG-4AVC Standard, it is possible to realize a degree of concurrency that corresponds to ½ of the number of macro blocks in the transversal direction and hence the most efficient concurrent processing.

Figure 18:
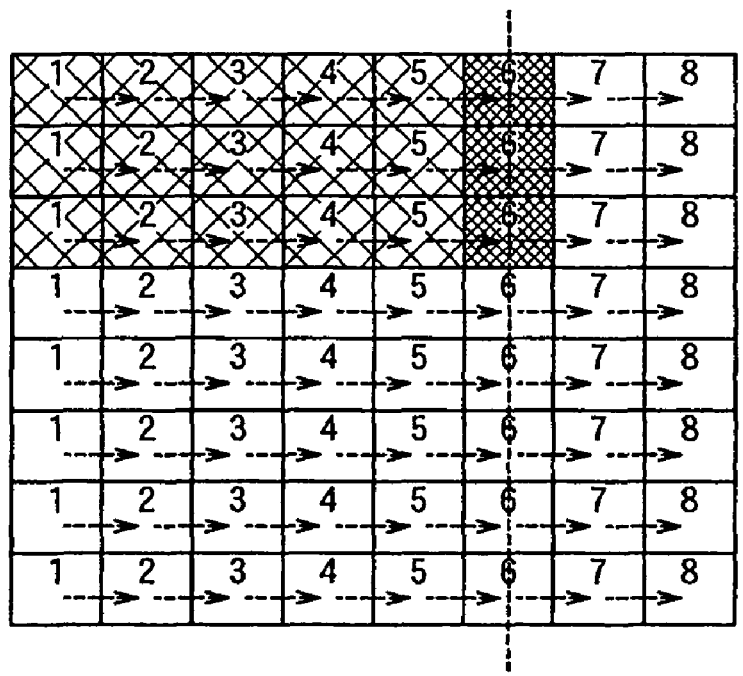
FIG. 18 is a schematic illustration of the progress of the concurrent processes of a video codec realized by applying the present invention according to the MPEG-2 Standard.

Additionally, if macro blocks that are dependent only on the left macro block are coded or decoded as in the case of a coding or decoding operation according to the MPEG-2 Standard, it is only necessary to alter the checking process of Step U33. In this case, as shown in FIG. 18, as the coding or decoding operation proceeds sequentially from the left end macro block of each slice, it is possible to realize a degree of concurrency that corresponds to the number of macro blocks in the transversal direction and hence the most efficient concurrent processing.

(Process of Determining the Macro Block to be Processed (Second Example))

The process of determining the macro block to be processed (Step U31) will be described below by referring to the second example thereof.

With the arrangement of Steps U311 to U3110 described above by referring to FIG. 12, the MB processing agents 30 detect a macro block that can be processed out of the entire picture regardless of the position in the picture of the macro block that can be processed.

Alternatively, however, it may be so arranged that the sequence to be followed for processing the macro blocks in a picture is uniquely determined in advance and the MB processing agents 30 retrieve and process macro blocks according to the sequence.

Figure 19:
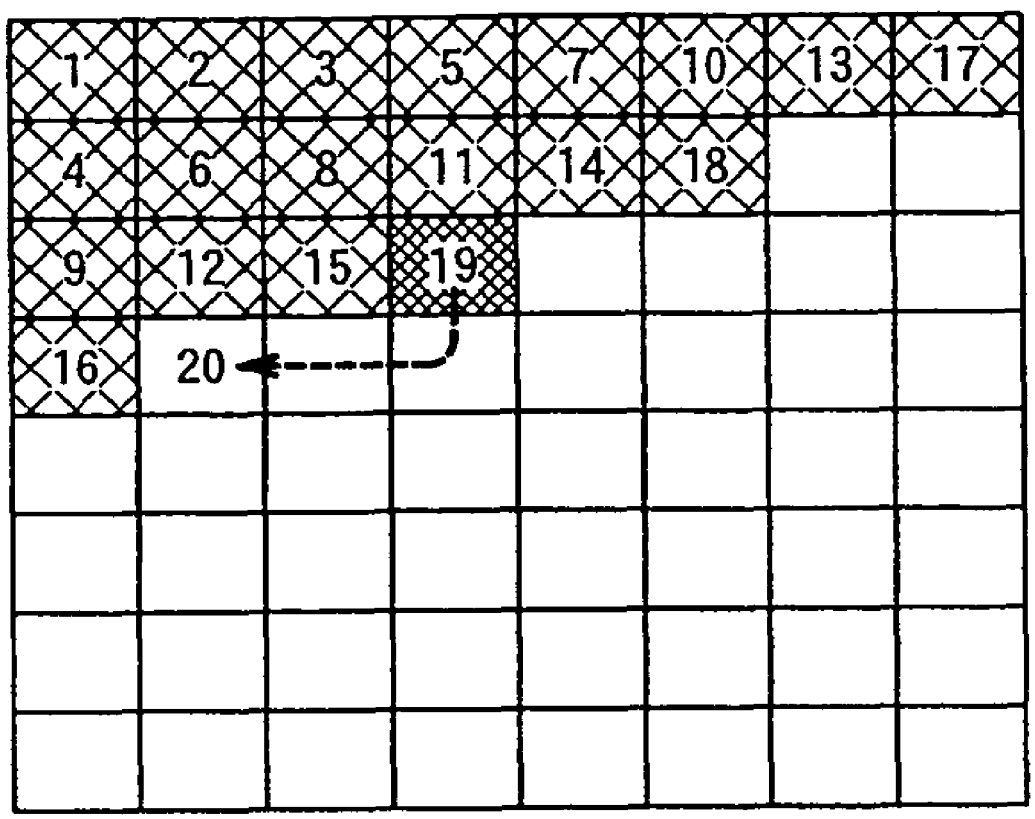
FIG. 19 is a schematic illustration of the process sequence of macro blocks when the sequence of processing the macro blocks in a picture is unequivocally determined in advance.

For example, in the case of the H. 264/MPEG-4AVC Standard, the process of cording or decoding an arbitrarily selected macro block depends on the left, upper left, upper and upper right macro blocks. Therefore, when an arbitrarily selected macro block is subjected to a coding or decoding process, it is desirable in principle to process the macro block that is located on the row right below it and on the second left column from it as shown in FIG. 19 immediately after the process.

Figure 20A:
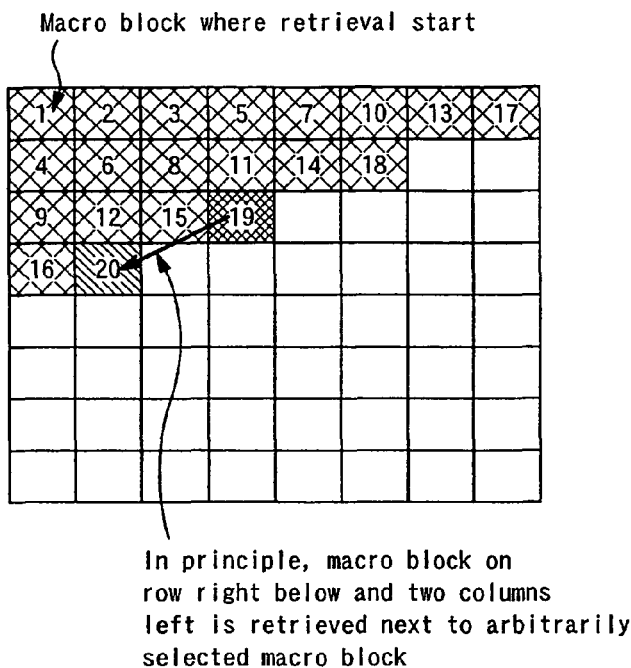
FIG. 20 is a schematic illustration of the process sequence of macro blocks beyond the lowermost slice or the leftmost column.
Figure 20B:
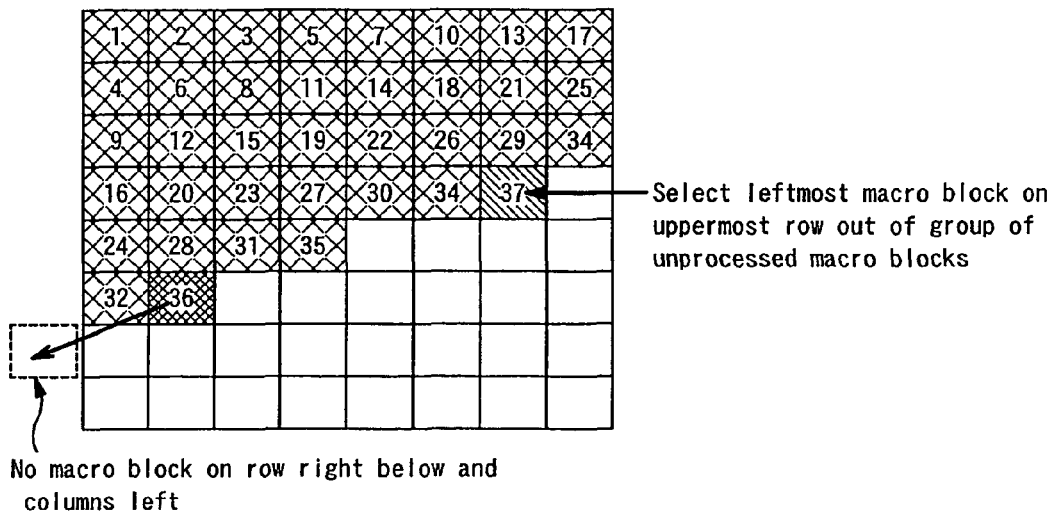

In view of this fact, in this example, the scanning sequence is uniquely defined in such a way that the sequence starts from the upper left macro block of the picture and, in principle, when a macro block is processed, the macro block located on the row right below it and on the second left column from it is retrieved next as shown in FIG. 20(A). Additionally, the scanning sequence is so defined that, when the second left column of a macro block does not exist on the row right below it because it is out of the picture region, the leftmost macro block on the uppermost slice (row) is retrieved.

When the scanning sequence is defined in this way for retrieval, the coding or decoding process proceeds sequentially from the right end toward the left end of each row on a one by one basis while it proceeds in such a way that a macro block on a row is processed at a timing delayed by two macro blocks (to the left) from the coding or decoding operation of a macro block right above it.

Figure 21:
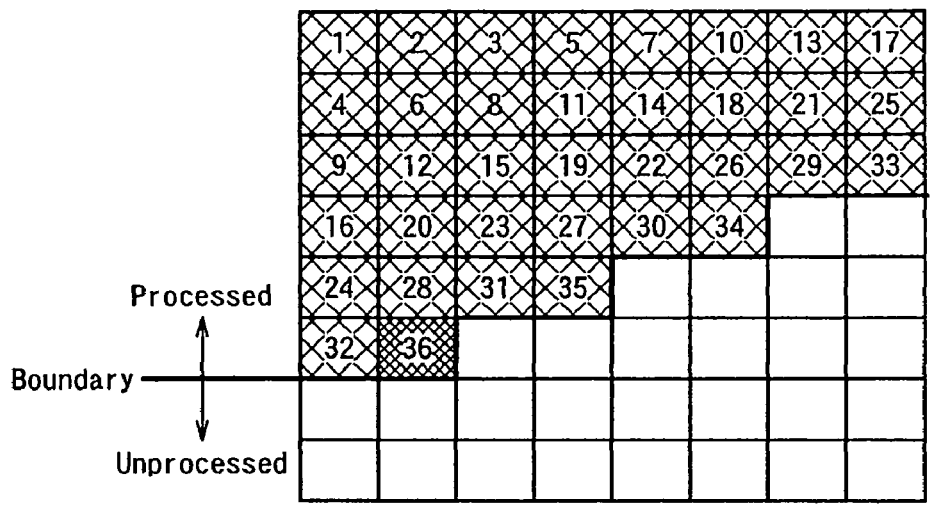
FIG. 21 is a schematic illustration of the stepped boundary of the processed macro blocks and the unprocessed macro blocks.

Therefore, as shown in FIG. 21, the boundary separating the processed macro blocks and the unprocessed macro blocks shows steps. In other words, the coding or decoding process proceeds concurrently stepwise. The concurrent processing proceeds stepwise from the upper left end toward the lower right end.

Thus, the sequence of processing the macro blocks in a picture is uniquely defined in advance and the MB processing agents 30 retrieve macro blocks according to the sequence to detect a macro block that can be processed and actually process the detected macro block for coding or decoding. With this arrangement, the state management section 33 is not required to know which MB processing agent 30 (30-$n$) is processing which macro block so that it may be configured in a simple manner. Additionally, as a macro block located on the row right below it and on the second left column from the macro block being processed is selected for the next processing operation, it is possible to make a concurrent process proceed most efficiently to improve the processing speed when macro blocks show a dependency relationship defined in the H. 264/MPEG-4AVC Standard.

Now, the process (Step U31) that the MB processing agents 30 follow to detect a macro block (X0, Y0) when the scanning sequence is uniquely defined for retrieval will be described specifically below.

Firstly, the variables that are used in the description of the processing flow will be described.

The variables that have a common value for the MB processing agents 30 are listed below.

PicMbHeight: the number of macro blocks on each vertical line of a picture (a frame)

PicMbWidth: the number of macro blocks on each horizontal line of a picture (a frame)

ParallelMbHeight: the number of rows of the region produced by dividing a picture for stepwise concurrent processing StepMbWidth: the number of macro blocks that are jumped over leftward on the row right below for stepwise concurrent processing Sx, Sy: virtual address of a macro block in a virtual region formed by horizontally extending the plurality of regions produced by division for concurrent processing Sx0: the column address of the macro block selected on the uppermost slice when the processing proceeds in an inclined direction on the virtual region.

The variables that have different values for each MB processing agent are listed below.

X0, Y0: the macro block to be coded or decoded by the MB processing agent #0 st0: a flag that indicates that the MB processing agent #0 can code or decode the macro block or not 1 indicates that the MB processing agent can code or decode it. 0 indicates that the MB processing agent cannot code or decode it.

end0: a flag that indicates the end of coding or decoding by the MB processing agent #0

1 indicates that the coding or decoding is ended. 0 indicates that the coding or decoding is not ended.

base0: the row address of the uppermost row of the region produced by division for stepwise concurrent processing The above listed variables will be described further by referring to the related drawings.

Figure 22:
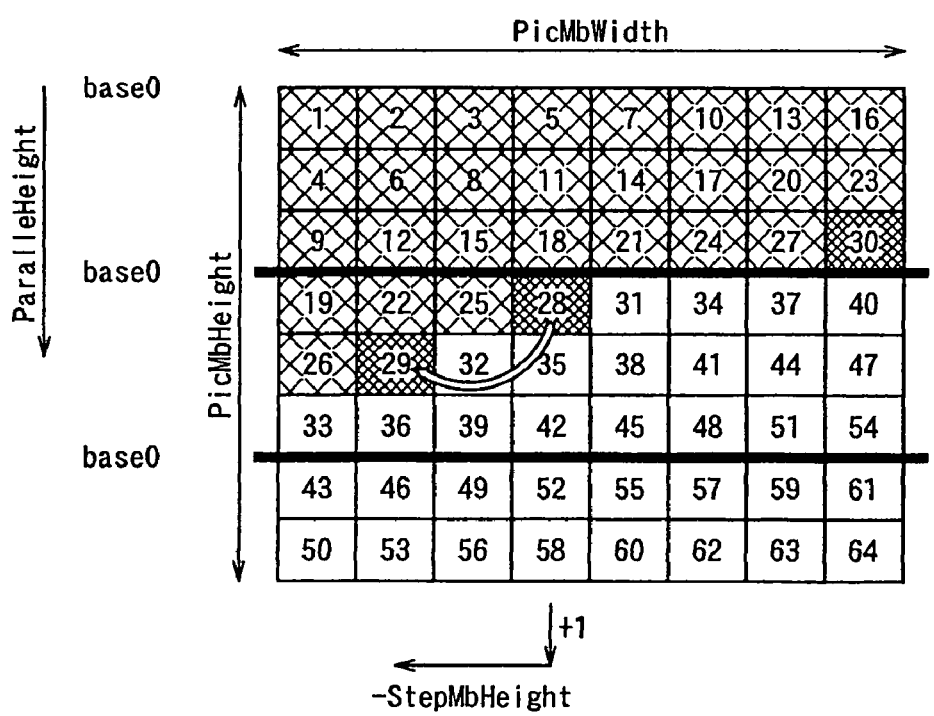
FIG. 22 is a schematic illustration of PicMbHeight, PicMbWidth, ParallelMbHeight and so on in a picture.

As shown in FIG. 22, PicMbHeight indicates the number of macro blocks arranged vertically in a picture (the number of slices in a picture) and PicMbWidth indicates the number of macro blocks arranged horizontally (the number of columns).

Figure 23A:
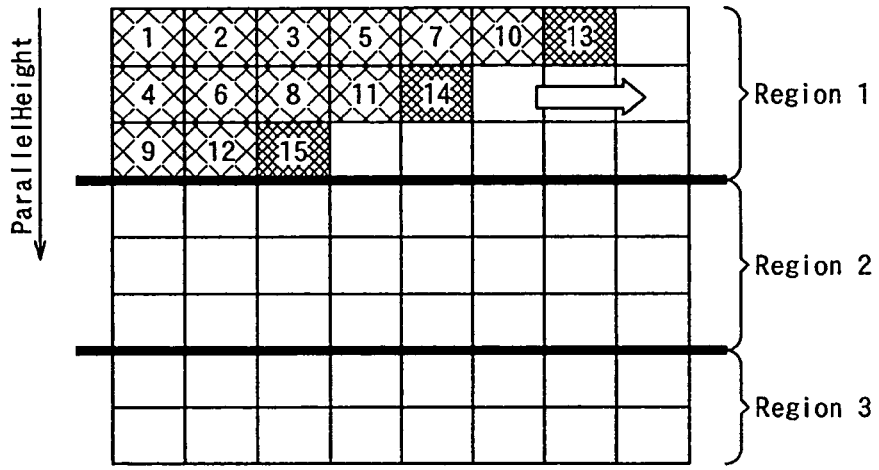
FIG. 23 is a schematic illustration of the concurrent processes in each region defined by dividing a picture vertically.
Figure 23B:
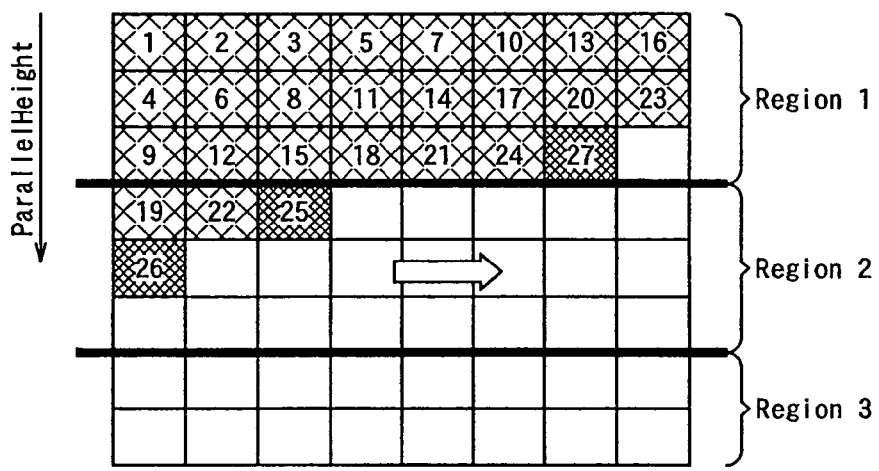
Figure 23C:
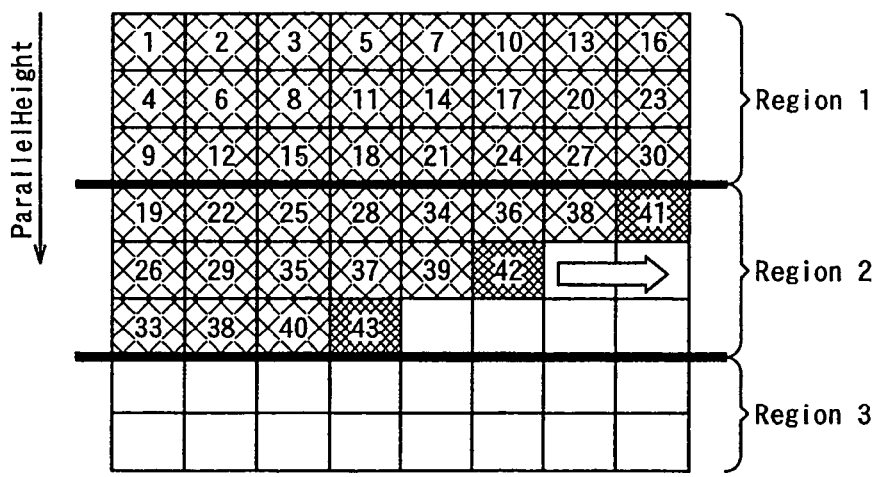

In this example, a picture is horizontally divided into a plurality of regions so that all the regions have a same number of rows as shown in FIG. 22 for stepwise concurrent processing in the regions. As a picture is divided in this way for processing, it is possible to reduce the capacity of the memory for holding the outcome of processing after coding or decoding. Assume here that a picture is divided into three regions including the first, second and third regions. Then, all the macro blocks of the first region are subjected to stepwise concurrent processing and subsequently all the macro blocks of the second region are subjected to stepwise concurrent processing. In other words, the stepwise concurrent processing proceeds on a region by region basis in the sequence of (A)→(B)→(C) as shown in FIG. 23. ParallelMbHeight indicates the vertical length of each region produced by the division or the number of rows (the number of slices) of each region for concurrent processing.

As shown in FIG. 22, base0 is the variable that indicates the position of the uppermost slice of each region produced by the division.

In this example, when a macro block is processed, the macro block that is processed next is located on the row right below it and to the left by a predetermined number of macro blocks in principle as shown in FIG. 22. StepMbWidth indicates the number of macro blocks that are jumped over for the above described processing sequence. While it is assumed that StepMbWidth is equal to 2 in the following description, the value of StepMbWidth is not limited to 2 and may be an integer not smaller than 0.

In this example, the regions produced by the division that are originally laid one on the other as shown in FIG. 24A are virtually extended in the horizontal direction to form a virtual region as shown in FIG. 24B and the stepwise concurrent processing is made to proceed in the virtual region. As the original picture is extended to form a virtual region in this way, the stepwise concurrent processing proceeds efficiently (Sx, Sy) is the address on the virtual region of the macro block that is being retrieved. Sx is the row address of the macro block in the virtual region (in the vertical direction), while Sy is the column address in the virtual region (in the horizontal direction). Sx0 is the variable that indicates the column position of the uppermost slice on the inclined line where the processing is going on for stepwise concurrent processing (in other words, the horizontal position where the processing starts on the inclined line) on the virtual region formed by extending the regions produced by the division in the horizontal direction as shown in FIG. 24(B).

Figure 25:
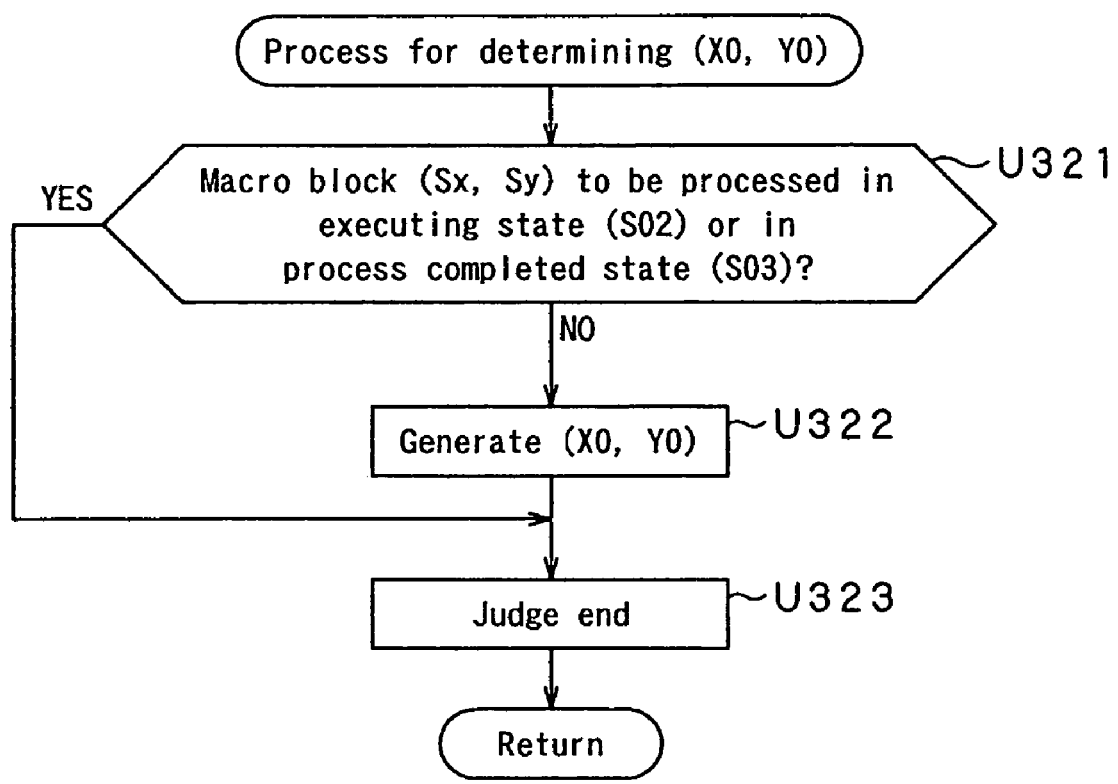
FIG. 25 is a flowchart of another example of the processing operation of determining a macro block (X0, Y0)

FIG. 25 is a flowchart of the specific processing flow of determining the macro block (X0, Y0) (Step U31) by the MB processing agents.

As the process of determining the macro block (X0, Y0) starts, firstly the MB processing agents 30 determines in Step U321 if the macro block that is identified by virtual address (Sx, Sy) and being retrieved is either in an executing state (S02) or in a process completed state (S03) or not. If it is either in an executing state (S02) or in a process completed state (S03), they proceed to Step U322 for generating (x0, y0). If, on the other hand, it is neither in an executing state (S02) nor in a process completed state (S03), they proceed to Step U323 for judging the end of the process.

The processing operation of Step U321 means that, when an MB processing agent 30 determines the macro block to be processed, the position of the macro block is not given to it unless the immediately preceding macro block (the macro block located on the slice right above and to the right by two columns in principle) is being processed or has been processed and the position of the macro block that is being retrieved at present is given as that of the macro block (X0, Y0) to be processed by the MB processing agent 30.

In Step U322 for generating (x0, y0), the position (X0, Y0) of the macro block to be processed is computationally determined. When the processing operation of Step U322 ends, the macro block pg agents 30 proceed to Step U323 for judging the end of the process.

In Step U323 for judging the end of the process, it is determined if all the process in the picture is completed or not.

As the processing operation of Step U323 for judging the end of the process is terminated, the process of determining the macro block (X0, Y0) ends and the MB processing agents return to the main flow.

Figure 26:
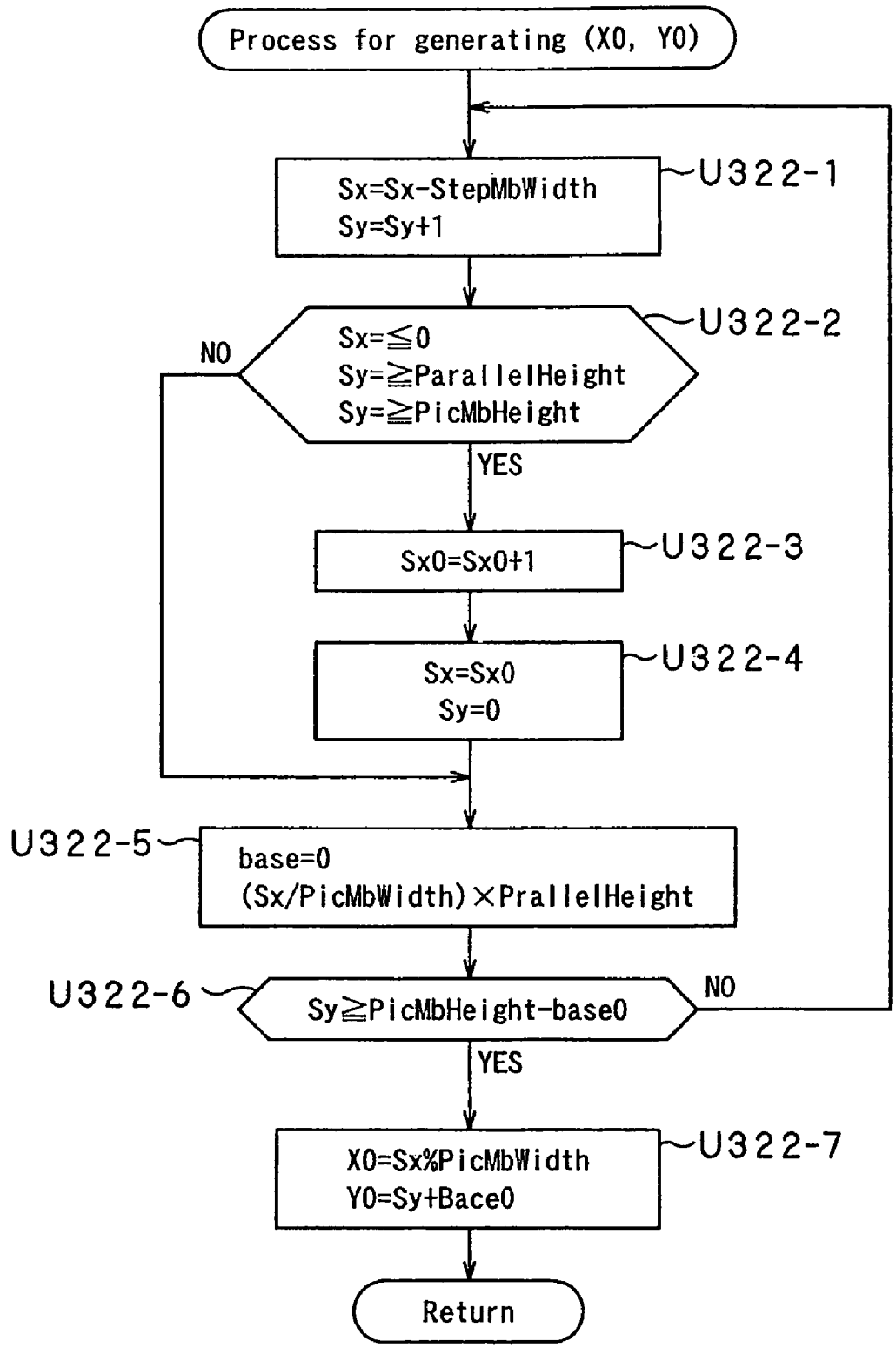
FIG. 26 is a flowchart of the processing operation of generating (X0, Y0)

FIG. 26 is a flowchart of the processing operation of generating (X0, Y0) in Step U322.

Referring to FIG. 26, firstly in Step U322-1, the MB processing agents 30 carry out the computational operation of formulas (31) and (32) shown below.

$$Sx=Sx-\text{StepMbWidth} \quad (31)$$

$$Sy=Sy+1 \quad (32)$$

More specifically, the MB processing agents 30 subtract StepMbWidth, which is the number of blocks to be jumped over leftward, from the virtual address Sx in the horizontal direction and add 1 to the virtual address Sy in the vertical direction. In short, the virtual address (Sx, Sy) that is being retrieved at present is moved to a position on the row located immediately below and on the second column to the left.

Subsequently, in Step U322-2, the MB processing agents 30 determine if the horizontal virtual address Sx is smaller than 0 or not and if the vertical virtual address Sy is not smaller than ParallelMbHeight or not. In other words, it is determined if the macro block indicated by the virtual address (Sx, Sy) exists in the virtual region (obtained by horizontally extending the regions produced by the division) as shown in FIG. 24(B) or not in Step U322-2. If a macro block exists at the position of the virtual address (Sx, Sy) (No in Step U322-2), the MB processing agents 30 proceed to Step U322-5. If, on the other hand, no macro block exists at the position of the virtual address (Sx, Sy) (Yes in Step U322-2), they proceed to Step U322-3.

In Step U322-3, the MB processing agents 30 add 1 to the starting position Sx0 where the processing start on the inclined line. Then, in Step U322-4, the MB processing agents 30 substitute Sx, the starting position on the inclined line obtained in Step U322-3, for the horizontal virtual address Sx and 0 for the vertical virtual address Sy. Because no macro block exists at the position on the row located immediately below and on the second column to the left, the virtual address (Sx, Sy) is moved to the leftmost macro block on the uppermost slice of the unprocessed macro blocks in Steps U322-3 and 322-4. When the processing operation of Step U322-4 is over, the MB processing agents 30 proceed to Step U322-5.

In Step U322-5, the MB processing agents 30 computationally determine the value of the base0 by means of formula (33) blow.

$$\text{base0}=(Sx/\text{PicMbWidth})\times\text{ParallelHeight} \quad (33)$$

In the formula (33), "Sx/PicMbWidht" is an arithmetic operation of obtaining the quotient (an integer value) of the division by PicMbWidth of Sx.

Then, in Step U322-6, the MB processing agents 30 compute formula (34) below.

$$Sy\geq\text{ParallelHeight}-\text{base0} \quad (34)$$

In other words, in Step U322-6, it is determined if the sum of the addition of the vertical virtual address Sy and base0 is not smaller than ParallelMbHeight or not. Differently stated, it is determined if the address of the macro block that is being retrieved exceeds the lowermost row of the actual frame or not. If it exceeds the lowermost row (No in Step U322-6), the MB processing agents 30 return to Step U322-1 to repeat the operation of generating (x0, y0). If, on the other hand, it does not exceed the lowermost row (Yes in Step U322-6), the MB processing agents 30 proceed to Step U322-7.

Subsequently, in Step U322-7, the MB processing agents 30 compute formulas (35) and (36) shown below to determine the address (X0, Y0) of the macro block to be processed.

$$X0 = Sx \% \text{PicMbWidth} \quad (35)$$

$$Y0 = Sy + \text{Base0} \quad (36)$$

Note that "Sx % PicMbWidth" in the formula (35) is the arithmetic operation of determining the residue (an integer value) of the division by PicMbWidth of Sx.

Figure 27:
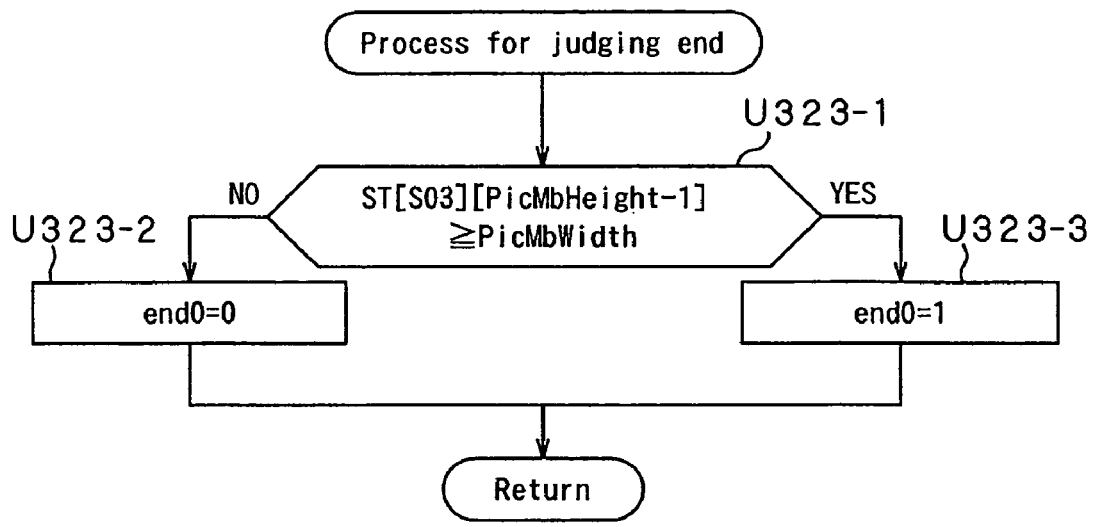
FIG. 27 is a flowchart of the processing operation of judging an end.

FIG. 27 is a flowchart of the processing operation of judging the end of the process of Step U323.

As the processing operation of judging the end of the process stars, the MB processing agents 30 determine if equation (37) shown below holds true or not in Step U323-1.

$$ST[S03][\text{PicMbHeight}-1] > \text{PicMbWidth} \quad (37)$$

The formula (37) holds true when all the macro blocks of the lowermost row, or slice, are in a process completed state (S03). In other words, if a coding or decoding process is completed for all the macro blocks of the picture (frame) or not is asked in the formula (37).

If a coding or decoding process is not completed for all the macro blocks, the MB processing agents 30 proceed to Step U323-2, where they substitute 0 for the flag end0 to end the process and return to the main flow. If, on the other hand, a coding or decoding process is completed for all the macro blocks, the MB processing agents 30 proceed to Step U323-3, where they substitute 1 for the flag end0 and return to the main flow.

As a result of the above process, the MB processing agents 30 can determine the macro block (X0, Y0) to be coded or decoded. For the above-described process, the state management section 33 is not required to know which MB processing agent 30 is processing which macro block and the retrieving operation is conducted uniquely so that the state management section 33 can be configured in a simple manner. Additionally, the degree of concurrency is raised by processing macro blocks evenly both in the horizontal direction and in the vertical direction to consequently improve the processing speed.

When macro blocks that are dependent on the left, upper left, upper and upper right macro blocks are coded or decoded as in the case of a coding or decoding operation according to the H. 264/MPEG-4AVC Standard, the degree of concurrency is maximized to minimize the processing time by defining StepMbWidth=2.

Figure 28:
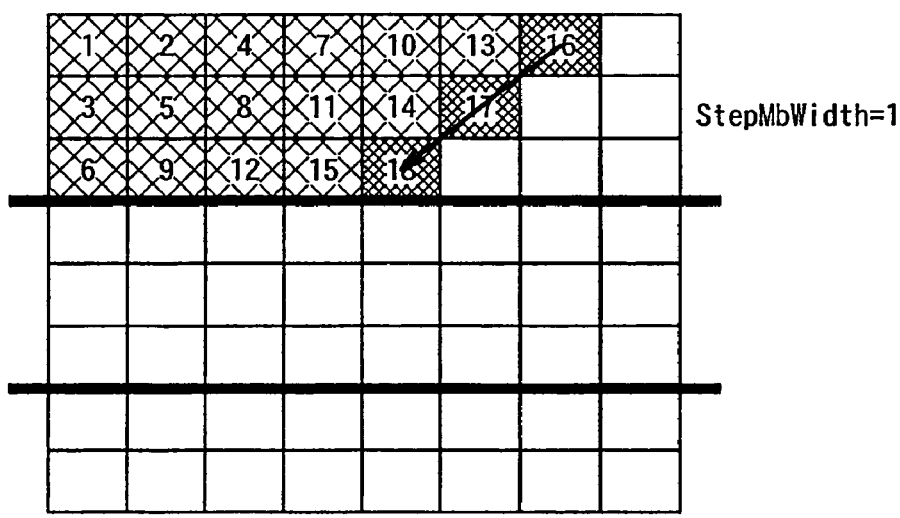
FIG. 28 is a schematic illustration of an example of concurrent processes when "having no dependency relationship with the upper right macro block"
Figure 29:
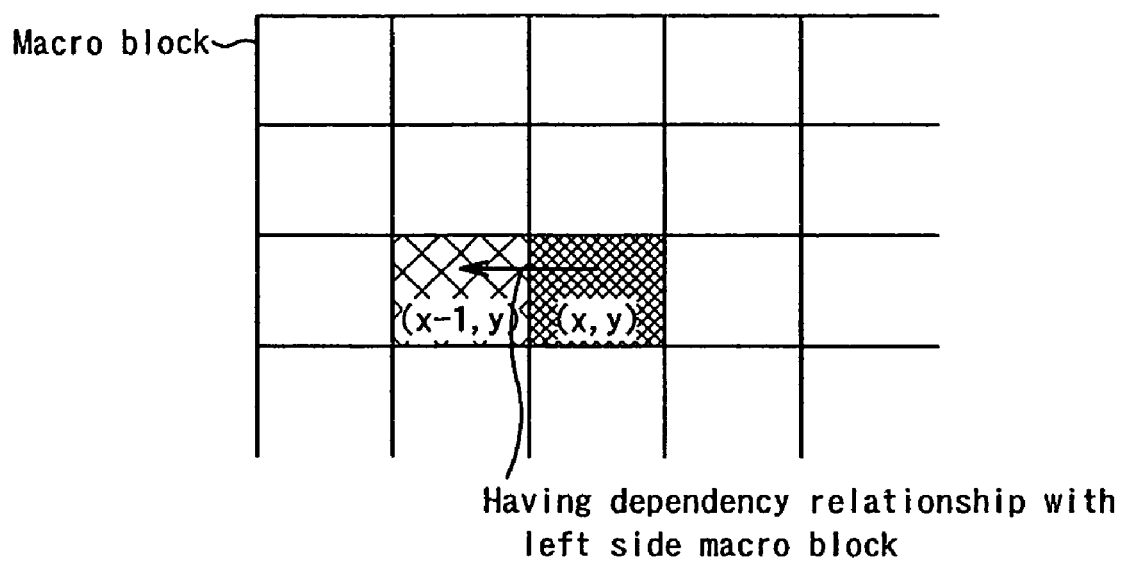
FIG. 29 is a schematic illustration of the dependency relationship of macro blocks according to the MPEG-2 Standard.
Figure 30:
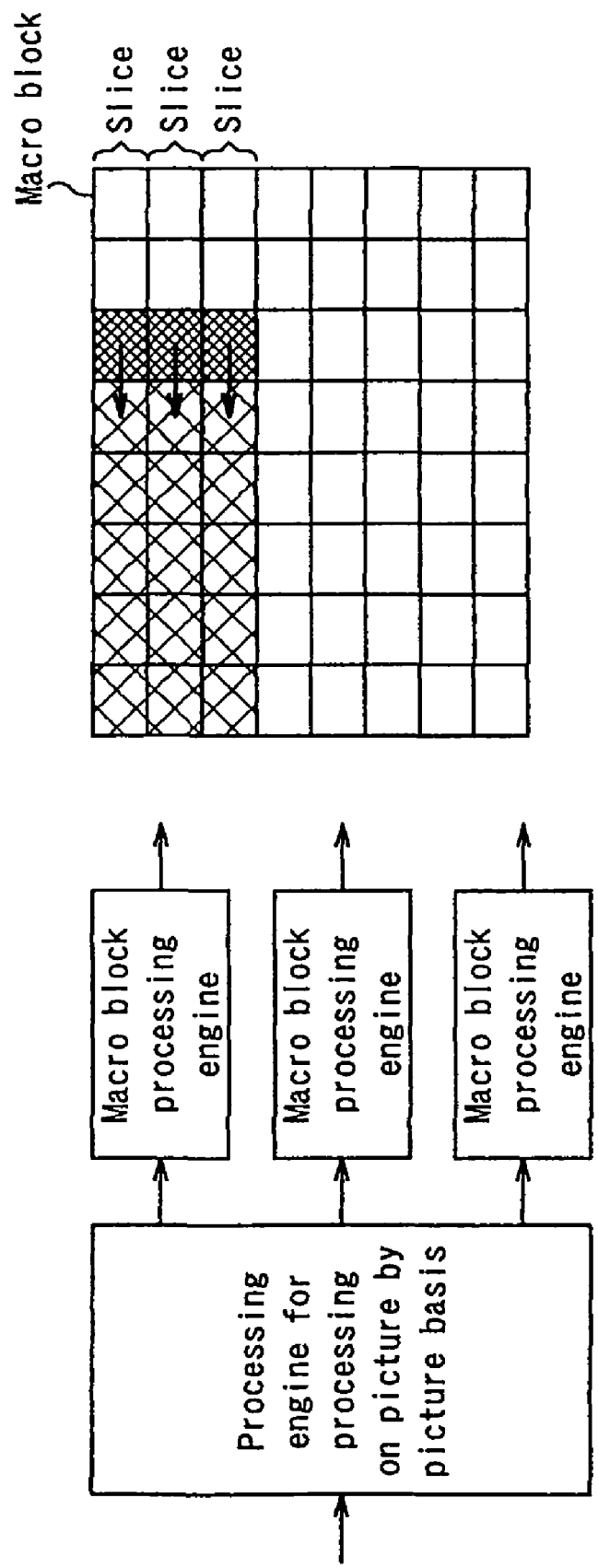
FIG. 30 is a schematic illustration of the concurrent processes by macro block processing engines according to the MPEG-2 Standard.
Figure 31:
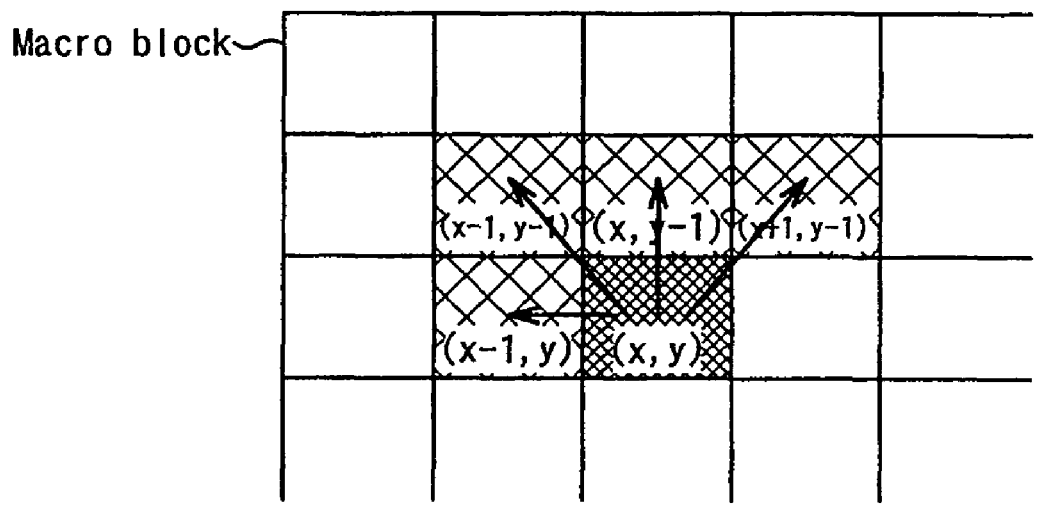
FIG. 31 is a schematic illustration of the dependency relationship of macro blocks according to the MPEG-4 Standard or the H. 264/MPEG-4AVC Standard.

While StepMbWidth=2 is defined in this example, the boundary of the processed macro blocks and the unprocessed macro blocks shows steps of a row and a column as shown in FIG. 28 when StepMbWidth=1 is defined. This arrangement can be applied to the codec of a picture coding system that does not show any dependency relationship relative to the upper right macro block.

It should be understood by those skilled in the art that various modifications, combinations, sub-combinations and alterations may occur depending on design requirements and other factors insofar as they are within the scope of the appended claims or the equivalents thereof.

What is claimed is:

1. A coding apparatus for dividing a picture to form a matrix of macro blocks, each having a predetermined number of pixels, and conducting coding processes on moving picture data on a macro block by macro block basis, each being produced by the division, the apparatus comprising:
a plurality of macro block processing sections for coding moving picture data concurrently on a macro block by macro block basis; and
a state management section for managing the state of processing of each macro block in a single picture;
the state management section being adapted to manage each macro block in a single picture in terms of being in a process completed state;
each macro block processing section being adapted to retrieve the state management section, detect a macro block not in a process completed state, execute a coding process on the detected macro block and bring the state of the macro block of the state management section into a process completed state upon ending the coding process on the macro block,
wherein the state management section stores, for each row in the matrix, an end position of a macro block in the process completed state.

2. The apparatus according to claim 1, wherein
the state management section is adapted to discriminate and manage each macro block of a picture in terms of being in a ready state by the macro block processing section, in an executing state by the macro block processing section or in the process completed state by the macro block processing section for managing each macro block in a single picture; and
each macro block processing section
retrieves the state management section and detects a macro block in a ready state;
shifts the state being managed by the state management section of the macro block detected by it to an executing state;
codes the detected macro block; and
upon ending the process of coding the macro block, brings the state being managed by the state management section into a process completed state.

3. The apparatus according to claim 2, wherein
each macro block processing section codes at least from the left side macro block in the group of macro blocks arranged in a row direction in the picture with priority; and
the state management section defines a row address to a group of macro blocks arranged in a row direction in the picture and manages the number of macro blocks in each state at each row address.

4. A coding apparatus for dividing a picture to form a matrix of macro blocks, each having a predetermined number of pixels, and conducting coding processes on moving picture data on a macro block by macro block basis, each being produced by the division, the apparatus comprising:
a plurality of macro block processing sections for coding moving picture data concurrently on a macro block by macro block basis; and
a state management section for managing the state of processing of each macro block in a single picture;
the state management section being adapted to manage each macro block in a single picture in terms of being in a process completed state;
each macro block processing section being adapted to retrieve the state management section, detect a macro block not in a process completed state, execute a coding process on the detected macro block and bring the state of the macro block of the state management section into a process completed state upon ending the coding process on the macro block,
wherein the state management section is adapted to discriminate and manage each macro block of a picture in terms of being in a ready state by the macro block processing section in an executing state by the macro block processing section or in the process completed state by the macro block processing section for managing each macro block in a single picture; and wherein each macro block processing section retrieves the state management section and detects a macro block in a ready state; shifts the state being managed by the state management section of the macro block detected by it to an executing state; codes the detected macro block; and upon ending the process of coding the macro block, brings the state being managed by the state management section into a process completed state, wherein each macro block processing section codes at least from the left side macro block in the group of macro blocks arranged in a row direction in the picture with priority; and wherein the state management section defines a row address to a group of macro blocks arranged in a row direction in the picture and manages the number of macro blocks in each state at each row address, and wherein when executing a coding process on a macro block to be coded according to a coding standard requiring referring to the outcome of coding the left, upper left, upper and upper right macro blocks and if the position of the macro block to be coded is x as counted from the left end;

the number of macro blocks in a process completed state at the row address right above the macro block to be coded is ST [S03] [Y−1], the number of macro blocks in a process completed state at the row address of the macro block to be coded is ST [S03] [Y] and the number of macro blocks in a ready state at the row address of the macro block to be coded is ST [S01] [Y], each macro block processing section retrieves and codes a macro block that makes logical formula (1) below hold true:

$$\{ST[S03][Y-1]>(X+1)\} \text{ AND } \{ST[S03][Y]>(X-1)\} \text{ AND } \{ST[S01][Y]>X\} \quad (1).$$

5. A coding apparatus for dividing a picture to form a matrix of macro blocks, each having a predetermined number of pixels, and conducting coding processes on moving picture data on a macro block by macro block basis, each being produced by the division, the apparatus comprising:

a plurality of macro block processing sections for coding moving picture data concurrently on a macro block by macro block basis; and a state management section for managing the state of processing of each macro block in a single picture;

the state management section being adapted to manage each macro block in a single picture in terms of being in process completed state;

each macro block processing section being adapted to retrieve the state management section, detect a macro block not in a process completed state, execute a coding process on the detected macro block and bring the state of the macro block of the state management section into a process completed state upon ending the coding process on the macro block, wherein the state management section is adapted to discriminate and manage each macro block of a picture in terms of being in a ready state by the macro block processing section, in an executing state by the macro block processing section or in the process completed state by the macro block processing section for managing each macro block in a single picture; and wherein each macro block processing section retrieves the state management section and detects a macro block in a ready state; shifts the state being managed by the state management section of the macro block detected by it to an executing state; codes the detected macro block; and upon ending the process of coding the macro block, brings the state being managed by the state management section into a process completed state, wherein each macro block processing section codes at least from the left side macro block in the group of macro blocks arranged in a row direction in the picture with priority; and wherein the state management section defines a row address to a group of macro blocks arranged in a row direction in the picture and manages the number of macro blocks in each state at each row address, and wherein when executing a coding process on a macro block to be coded according to a coding standard requiring referring to the outcome of coding the left macro block and if the position of the macro block to be coded is x as counted from the left end;

the number of macro blocks in a process completed state at the row address of the macro block to be coded is ST [S03] [Y] and the number of macro blocks in a ready state at the row address of the macro block to be coded is ST [S01] [Y], each macro block processing section retrieves and codes a macro block that makes logical formula (2) below hold true:

$$\{ST[S03][Y]>(X-1)\} \text{ AND } \{ST[S01][Y]>X\} \quad (2).$$

6. A decoding apparatus for dividing a picture to form a matrix of macro blocks, each having a predetermined number of pixels, and conducting decoding processes on moving picture data on a macro block by macro block basis, each being produced by the division, the apparatus comprising:

a plurality of macro block processing sections for decoding moving picture data concurrently on a macro block by macro block basis; and a state management section for managing the state of processing of each macro block in a single picture;

the state management section being adapted to manage each macro block in a single picture in terms of being in a process completed state;

each macro block processing section being adapted to retrieve the state management section, detect a macro block not in a process completed state, execute a decoding process on the detected macro block and bring the state of the macro block of the state management section into a process completed state upon ending the decoding process on the macro block, wherein the state management section stores, for each row in the matrix, an end position of a macro block in the process completed state.

7. The apparatus according to claim 6, wherein the state management section is adapted to discriminate and manage each macro block of a picture in terms of being in a ready state by the macro block processing section, in an executing state by the macro block processing section or in the process completed state by the macro block processing section for managing each macro block in a single picture; and each macro block processing section
retrieves the state management section and detects a macro block in a ready state;
shifts the state being managed by the state management section of the macro block detected by it to an executing state;
decodes the detected macro block; and
upon ending the process of decoding the macro block, brings the state being managed by the state management section into a process completed state.

8. The apparatus according to claim 7, wherein
each macro block processing section decodes at least from the left side macro block in the group of macro blocks arranged in a row direction in the picture with priority; and
the state management section defines a row address to a group of macro blocks arranged in a row direction in the picture and manages the number of macro blocks in each state at each row address.

9. A decoding apparatus for dividing a picture to form a matrix of macro blocks, each having a predetermined number of pixels, and conducting decoding processes on moving picture data on a macro block by macro block basis, each being produced by the division, the apparatus comprising:
a plurality of macro block processing sections for decoding moving picture data concurrently on a macro block by macro block basis; and
a state management section for managing the state of processing of each macro block in a single picture;
the state management section being adapted to manage each macro block in a single picture in terms of being in a process completed state;
each macro block processing section being adapted to retrieve the state management section, detect a macro block not in a process completed state, execute a decoding process on the detected macro block and bring the state of the macro block of the state management section into a process completed state upon ending the decoding process on the macro block,
wherein the state management section is adapted to discriminate and manage each macro block of a picture in terms of being in a ready state by the macro block processing section, in an executing state by the macro block processing section or in the process completed state by the macro block processing section for managing each macro block in a single picture; and
wherein each macro block processing section retrieves the state management section and detects a macro block in a ready state; shifts the state being managed by the state management section of the macro block detected by it to an executing state; decodes the detected macro block; and upon ending the process of decoding the macro block, brings the state being managed by the state management section into a process completed state,
wherein each macro block processing section decodes at least from the left side macro block in the group of macro blocks arranged in a row direction in the picture with priority; and
wherein the state management section defines a row address to a group of macro blocks arranged in a row direction in the picture and manages the number of macro blocks in each state at each row address, and
wherein when executing a decoding process on a macro block to be decoded according to a decoding standard requiring referring to the outcome of decoding the left, upper left, upper and upper right macro blocks, and if
the position of the macro block to be decoded is x as counted from the left end;
the number of macro blocks in a process completed state at the row address right above the macro block to be decoded is ST [S03] [Y=1],
the number of macro blocks in a process completed state at the row address of the macro block to be decoded is ST [S03] [Y] and
the number of macro blocks in a ready state at the row address of the macro block to be decoded is ST [S01] [Y],
each macro block processing section retrieves and decodes a macro block that makes logical formula (1) below hold true:

$$\{ST[S03][Y-1]>(X+1)\} \text{ AND } \{ST[S03][Y]>(X-1)\} \text{ AND } \{ST[S01][Y]>X\} \quad (1).$$

10. A decoding apparatus for dividing a picture to form a matrix of macro blocks, each having a predetermined number of pixels, and conducting decoding processes on moving picture data on a macro block by macro block basis, each being produced by the division, the apparatus comprising:
a plurality of macro block processing sections for decoding moving picture data concurrently on a macro block by macro block basis; and
a state management section for managing the state of processing of each macro block in a single picture;
the state management section being adapted to manage each macro block in a single picture in terms of being in a process completed state;
each macro block processing section being adapted to retrieve the state management section, detect a macro block not in a process completed state, execute a decoding process on the detected macro block and bring the state of the macro block of the state management section into a process completed state upon ending the decoding process on the macro block,
wherein the state management section is adapted to discriminate and manage each macro block of a picture in terms of being in a ready state by the macro block processing section, in an executing state by the macro block processing section or in the process completed state by the macro block processing section for managing each macro block in a single picture; and
wherein each macro block processing section retrieves the state management section and detects a macro block in a ready state; shifts the state being managed by the state management section of the macro block detected by it to an executing state; decodes the detected macro block; and upon ending the process of decoding the macro block, brings the state being managed by the state management section into a process completed state,
wherein each macro block processing section decodes at least from the left side macro block in the group of macro blocks arranged in a row direction in the picture with priority; and wherein the state management section defines a row address to a group of macro blocks arranged in a row direction in the picture and manages the number of macro blocks in each state at each row address, and
wherein when executing a decoding process on a macro block to be decoded according to a decoding standard requiring referring to the outcome of decoding the left macro block and if
the position of the macro block to be decoded is x as counted from the left end;
the number of macro blocks in a process completed state at the row address of the macro block to be decoded is ST [S03] [Y] and
the number of macro blocks in a ready state at the row address of the macro block to be decoded is ST [S01] [Y],
each macro block processing section retrieves and decodes a macro block that makes logical formula (2) below hold true:

$$\{ST[S03][Y]>(X-1)\} \text{ AND } \{ST[S01][Y]>X\} \qquad (2).$$

11. A coding method of dividing a picture to form a matrix of macro blocks, each having a predetermined number of pixels, and conducting coding processes on moving picture data on a macro block by macro block basis, each being produced by the division, the method comprising the steps of:
coding moving picture data by means of a plurality of macro block processing agents for executing coding processes concurrently on a macro block by macro block basis; and
managing the state of processing of each macro block in a single picture in terms of being in a state where a process by the macro block processing agent is completed (process completed state) or not;
each macro block processing agent being adapted to
detect a macro block not in a process completed state,
execute a coding process on the detected macro block and bring the state of the macro block into a process completed state upon ending the coding process on the macro block,
wherein the managing step stores, for each row in the matrix, an end position of a macro block in the process completed state.

12. The method according to claim 11, wherein
each macro block of a picture is discriminated and managed in terms of being in a ready state by the macro block processing agent, an executing state by the macro block processing agent or the process completed state by the macro block processing agent for managing each macro block in a single picture; and
each macro block processing agent
detects a macro block in a ready state;
shifts the detected state of the macro block to an executing state;
codes the detected macro block; and
upon ending the process of coding the macro block, brings the state of the macro block into a process completed state.

13. The method according to claim 12, wherein
each macro block processing agent codes at least from the left side macro block in the group of macro blocks arranged in a row direction in the picture with priority; and
a row address is defined to a group of macro blocks arranged in a row direction in the picture and the number of macro blocks in each state at each row address is managed.

14. A coding method of dividing a picture to form a matrix of macro blocks, each having a predetermined number of pixels, and conducting coding processes on moving picture data on a macro block by macro block basis, each being produced by the division, the method comprising the steps of:
coding moving picture data by means of a plurality of macro block processing agents for executing coding processes concurrently on a macro block by macro block basis; and
managing the state of processing of each macro block in a single picture in terms of being in a state where a process by the macro block processing agent is completed (process completed state) or not;
each macro block processing agent being adapted to detect a macro block not in a process completed state, execute a coding process on the detected macro block and bring the state of the macro block into a process completed state upon ending the coding process on the macro block,
wherein each macro block of a picture is discriminated and managed in terms of being in a ready state by the macro block processing agent, in an executing state by the macro block processing agent or the process completed state by the macro block processing agent for managing each macro block in a single picture; and
wherein each macro block processing agent detects a macro block in a ready state; shifts the detected state of the macro block to an executing, state; codes the detected macro block; and upon ending the process of coding the macro block, brings the state of the macro block into a process completed state,
wherein each macro block processing agent codes at least from the left side macro block in the group of macro blocks arranged in a row direction in the picture with priority; and a row address is defined to a group of macro blocks arranged in a row direction in the picture and the number of macro blocks in each state at each row address is managed, and
wherein when executing a coding process on a macro block to be coded according to a coding standard requiring referring to the outcome of coding the left, upper left, upper and upper right macro blocks, and
if
the position of the macro block to be coded is x as counted from the left end;
the number of macro blocks in a process completed state at the row address right above the macro block to be coded is ST [S03] [Y−1],
the number of macro blocks in a process completed state at the row address of the macro block to be coded is ST [S03] [Y] and
the number of macro blocks in a ready state at the row address of the macro block to be coded is ST [S01] [Y],
each macro block processing agent retrieves and codes a macro block that makes logical formula (1) below hold true:

$$\{ST[S03][Y-1]>(X+1)\} \text{ AND } \{ST[S03][Y]>(X-1)\} \text{ AND } \{ST[S01][Y]>X\} \qquad (1).$$

15. A coding method of dividing a picture to form a matrix of macro blocks, each having a predetermined number of pixels, and conducting coding processes on moving picture data on a macro block by macro block basis, each being produced by the division, the method comprising the steps of:
coding moving picture data by means of a plurality of macro block processing agents for executing coding processes concurrently on a macro block by macro block basis; and
managing the state of processing of each macro block in a single picture in terms of being in a state where a process by the macro block processing agent is completed (process completed state) or not;

each macro block processing agent being adapted to detect a macro block not in a process completed state, execute a coding process on the detected macro block and bring the state of the macro block into a process completed state upon ending the coding process on the macro block, wherein each macro block of a picture is discriminated and managed in terms of being in a ready state by the macro block processing agent, in an executing state by the macro block processing agent or the process completed state by the macro block processing agent for managing each macro block in a single picture; and wherein each macro block processing agent detects a macro block in a ready state; shifts the detected state of the macro block to an executing state; codes the detected macro block; and upon ending the process of coding the macro block, brings the state of the macro block into a process completed state, wherein each macro block processing agent codes at least from the left side macro block in the group of macro blocks arranged in a row direction in the picture with priority; and a row address is defined to a group of macro blocks arranged in a row direction in the picture and the number of macro blocks in each state at each row address is managed, and wherein when executing a coding process on a macro block to be coded according to a coding standard requiring referring to the outcome of coding the left macro block and if the position of the macro block to be coded is x as counted from the left end;

the number of macro blocks in a process completed state at the row address of the macro block to be coded is ST [S03] [Y] and the number of macro blocks in a ready state at the row address of the macro block to be coded is ST [S01] [Y], each macro block processing agent retrieves and codes a macro block that makes logical formula (2) below hold true:

$$\{ST[S03][Y] > (X-1)\} \text{ AND } \{ST[S01][Y] > X\} \qquad (2).$$

16. A decoding method of dividing a picture to form a matrix of macro blocks, each having a predetermined number of pixels, and conducting decoding processes on moving picture data on a macro block by macro block basis, each being produced by the division, the method comprising the steps of:

decoding moving picture data by means of a plurality of macro block processing agents for executing decoding processes concurrently on a macro block by macro block basis; and managing the state of processing of each macro block in a single picture in terms of being in a state where a process by the macro block processing agent is completed (process completed state) or not;

each macro block processing agent being adapted to detect a macro block not in a process completed state, execute a decoding process on the detected macro block and bring the state of the macro block into a process completed state upon ending the decoding process on the macro block, wherein the managing step stores, for each row in the matrix, an end position of a macro block in the process completed state.

17. The method according to claim 16, wherein each macro block of a picture is discriminated and managed in terms of being in a ready state by the macro block processing agent, in an executing state by the macro block processing agent or in the process completed state by the macro block processing agent for managing each macro block in a single picture; and each macro block processing agent detects a macro block in a ready state;

shifts the detected state of the macro block to an executing state;

decodes the detected macro block; and upon ending the process of decoding the macro block, brings the state of the macro block into a process completed state.

18. The method according to claim 17, wherein each macro block processing agent decodes at least from the left side macro block in the group of macro blocks arranged in a row direction in the picture with priority; and a row address is defined to a group of macro blocks arranged in a row direction in the picture and the number of macro blocks in each state at each row address is managed.

19. A decoding method of dividing a picture to form a matrix of macro blocks, each having a predetermined number of pixels, and conducting decoding processes on moving picture data on a macro block by macro block basis, each being produced by the division, the method comprising the steps of:

decoding moving picture data by means of a plurality of macro block processing agents for executing decoding processes concurrently on a macro block by macro block basis; and managing the state of processing of each macro block in a single picture in terms of being in a state where a process by the macro block processing agent is completed (process completed state) or not;

each macro block processing agent being adapted to detect a macro block not in a process completed state, execute a decoding process on the detected macro block and bring the state of the macro block into a process completed state upon ending the decoding process on the macro block, wherein each macro block of a picture is discriminated and managed in terms of being in a ready state by the macro block processing agent, in an executing state by the macro block processing agent or in the process completed state by the macro block processing agent for managing each macro block in a single picture; and wherein each macro block processing agent detects a macro block in a ready state; shifts the detected state of the macro block to an executing state; decodes the detected macro block; and upon ending the process of decoding the macro block, brings the state of the macro block into a process completed state, wherein each macro block processing agent decodes at least from the left side macro block in the group of macro blocks arranged in a row direction in the picture with priority; and a row address is defined to a group of macro blocks arranged in a row direction in the picture and the number of macro blocks in each state at each row address is managed, and wherein when executing a decoding process on a macro block to be decoded according to a decoding standard requiring referring to the outcome of decoding the left, upper left, upper and upper right macro blocks, and if
the position of the macro block to be decoded is x as counted from the left end;
the number of macro blocks in a process completed state at the row address right above the macro block to be decoded is ST [S03] [Y−1],
the number of macro blocks in a process completed state at the row address of the macro block to be decoded is ST [S03] [Y] and
the number of macro blocks in a ready state at the row address of the macro block to be decoded is ST [S01] [Y],
each macro block processing agent retrieves and decodes a macro block that makes logical formula (1) below hold true:

$$\{ST[S03][Y-1] > (X+1)\} \text{ AND } \{ST[S03][Y] > (X-1)\} \text{ AND } \{ST[S01][Y] > X\} \qquad (1).$$

20. A decoding method of dividing a picture to form a matrix of macro blocks, each having a predetermined number of pixels, and conducting decoding processes on moving picture data on a macro block by macro block basis, each being produced by the division, the method comprising the steps of:

decoding moving picture data by means of a plurality of macro block processing agents for executing decoding processes concurrently on a macro block by macro block basis; and managing the state of processing of each macro block in a single picture in terms of being in a state where a process by the macro block processing agent is completed (process completed state) or not;

each macro block processing agent being adapted to detect a macro block not in a process completed state, execute a decoding process on the detected macro block and bring the state of the macro block into a process completed state upon ending the decoding process on the macro block, wherein each macro block of a picture is discriminated and managed in terms of being in a ready state by the macro block processing agent, in an executing state by the macro block processing agent or in the process completed state by the macro block processing agent for managing each macro block in a single picture; and wherein each macro block processing agent detects a macro block in a ready state; shifts the detected state of the macro block to an executing state; decodes the detected macro block; and upon ending the process of decoding the macro block, brings the site of the macro block into a process completed state, wherein each macro block processing agent decodes at least from the left side macro block in the group of macro blocks arranged in a row direction in the picture with priority; and a row address is defined to a group of macro blocks arranged in a row direction in the picture and the number of macro blocks in each state at each row address is managed, and wherein when executing a decoding process on a macro block to be decoded according to a decoding standard requiring referring to the outcome of decoding the left macro block and if
the position of the macro block to be decoded is x as counted from the left end;
the number of macro blocks in a process completed state at the row address of the macro block to be decoded is ST [S03] [Y] and
the number of macro blocks in a ready state at the row address of the macro block to be decoded is ST [S01] [Y],
each macro block processing agent retrieves and decodes a macro block that makes logical formula (2) below hold true:

$$\{ST[S03][Y] > (X-1)\} \text{ AND } \{ST[S01][Y] > X\} \qquad (2).$$

* * * * *